United States Patent
Ichikawa et al.

(10) Patent No.: US 10,095,227 B2
(45) Date of Patent: Oct. 9, 2018

(54) AUTOMATIC DRIVING SYSTEM

(71) Applicant: Toyota Jidosha Kabushiki Kaisha, Toyota-shi, Aichi-ken (JP)

(72) Inventors: Kentaro Ichikawa, Shizuoka-ken (JP); Toshiki Kindo, Yokohama (JP); Sho Otaki, Susono (JP); Yasuo Sakaguchi, Nagoya (JP); Bunyo Okumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/452,302

(22) Filed: Mar. 7, 2017

(65) Prior Publication Data
US 2017/0261984 A1    Sep. 14, 2017

(30) Foreign Application Priority Data
Mar. 9, 2016   (JP) .................................. 2016-045955

(51) Int. Cl.
G05D 1/00   (2006.01)
G05D 1/02   (2006.01)

(52) U.S. Cl.
CPC ......... G05D 1/0061 (2013.01); G05D 1/0088 (2013.01); G05D 1/0212 (2013.01)

(58) Field of Classification Search
CPC ... G05D 1/0061; G05D 1/0088; G05D 1/0212
USPC ...... 701/26, 400, 408, 411; 340/988, 995.19
See application file for complete search history.

(56) References Cited

U.S. PATENT DOCUMENTS

| | | | |
|---|---|---|---|
| 8,457,827 B1 | 6/2013 | Ferguson et al. | |
| 8,655,537 B2 | 2/2014 | Ferguson et al. | |
| 9,302,678 B2* | 4/2016 | Murphy | B60W 50/14 |
| 9,404,761 B2* | 8/2016 | Meuleau | G01C 21/3453 |
| 2010/0042282 A1 | 2/2010 | Taguchi et al. | |
| 2013/0110343 A1 | 5/2013 | Ichikawa et al. | |
| 2013/0197736 A1* | 8/2013 | Zhu | G05D 1/0088 701/26 |

(Continued)

FOREIGN PATENT DOCUMENTS

| | | |
|---|---|---|
| JP | 2008-129804 A | 6/2008 |
| JP | 2011-162132 A | 8/2011 |

(Continued)

*Primary Examiner* — Marthe Y Marc-Coleman
(74) *Attorney, Agent, or Firm* — Dinsmore & Shohl LLP

(57) ABSTRACT

An automatic driving system includes an actuator and an electronic control unit. The electronic control unit is configured to recognize a position, a surrounding environment, a state of the vehicle. The electronic control unit is configured to generate a first traveling plan based on the recognized position, the recognized surrounding environment, and the recognized state of the vehicle and calculate reliability of the first traveling plan. The electronic control unit is configured to generate a second traveling plan of the vehicle based on one or two of the recognized position, the recognized surrounding environment, and the recognized state of the vehicle and calculate reliability of the second traveling plan. The electronic control unit is configured to select a traveling plan having the higher reliability out of the first traveling plan and the second traveling plan, and control the traveling of the vehicle by the actuator.

14 Claims, 3 Drawing Sheets

(56) References Cited

U.S. PATENT DOCUMENTS

| | | | | |
|---|---|---|---|---|
| 2013/0261872 A1* | 10/2013 | Ferguson | ................ | G05D 1/00 |
| | | | | 701/28 |
| 2013/0274959 A1 | 10/2013 | Igarashi | | |
| 2015/0345966 A1* | 12/2015 | Meuleau | ............ | G01C 21/3453 |
| | | | | 701/23 |
| 2016/0327947 A1 | 11/2016 | Ishikawa et al. | | |

FOREIGN PATENT DOCUMENTS

| | | |
|---|---|---|
| JP | 2012-256242 A | 12/2012 |
| JP | 2014-106854 A | 6/2014 |
| JP | 2015-141611 A | 8/2015 |
| JP | 2015-178332 A | 10/2015 |
| JP | 2015-194798 A | 11/2015 |
| WO | 2011/158347 A1 | 12/2011 |
| WO | 2012/081096 A1 | 6/2012 |
| WO | 2014/091611 A1 | 6/2014 |

* cited by examiner

1

AUTOMATIC DRIVING SYSTEM

CROSS-REFERENCE TO RELATED APPLICATIONS

This application claims priority to Japanese Patent Application No. 2016-045955 filed on Mar. 9, 2016, which is incorporated herein by reference in its entirety including the specification, drawings and abstract.

BACKGROUND

1. Technical Field

The present disclosure relates to an automatic driving system of a vehicle.

2. Description of Related Art

A system which performs automatic driving control of a vehicle is described in, for example, Japanese Patent Application Publication No. 2014-106854 (JP 2014-106854 A). The system described in JP 2014-106854 A gives notification of requesting to release the automatic driving control to the driver in a case where it is determined that conditions for performing the automatic driving control are not satisfied when the automatic driving control of the vehicle is being performed. This system calculates a stop point where the vehicle is stoppable, such as a side strip having a sufficient width or an emergency parking area. Then, this system makes the vehicle automatically travel to the calculated stop point and stop at the stop point in a case where the driver does not release the automatic driving control even if the driver is given notification of requesting to release the automatic driving control.

SUMMARY

In a case of making the vehicle automatically travel to the stop point since the driver does not release the automatic driving control, it may not be easy to make the vehicle automatically travel to the stop point. In this case, since it is difficult to continue the automatic driving control, a driving operation is taken over to the driver.

Various aspects of the present disclosure can provide an automatic driving system capable of, in a case of taking over a driving operation to a driver, continuing automatic driving control as long as possible and securing a long time for taking over the driving operation to the driver.

A first aspect of the disclosure provides an automatic driving system of a vehicle. The automatic driving system of the vehicle according to the first aspect includes: an actuator and an electronic control unit. The actuator is configured to control traveling of the vehicle. The electronic control unit is configured to recognize a position of the vehicle based on a detection result of an external sensor or reception information of a receiver, the external sensor being mounted in the vehicle, and the external sensor being configured to detect external circumstances of the vehicle, recognize a surrounding environment of the vehicle based on the detection result of the external sensor, recognize a state of the vehicle based on a detection result of an internal sensor configured to detect the state of the vehicle, generate a first traveling plan of the vehicle based on the recognized position of the vehicle, the recognized surrounding environment of the vehicle, and the recognized state of the vehicle, calculate reliability of the first traveling plan based on at least one of reliability of the recognized position of the vehicle, reliability of recognition of the recognized surrounding environment of the vehicle, reliability of recognition of the recognized state of the vehicle, or the generated first traveling plan, generate a second traveling plan of the vehicle based on one or two of the recognized position of the vehicle, the recognized surrounding environment of the vehicle, and the recognized state of the vehicle, calculate reliability of the second traveling plan based on at least one of the generated second traveling plan or reliability of a recognition result used when the second traveling plan is generated among the recognized position of the vehicle, the recognized surrounding environment of the vehicle, and the recognized state of the vehicle, select a traveling plan having the higher reliability out of the first traveling plan and the second traveling plan, and control the traveling of the vehicle by the actuator based on the selected traveling plan.

In this automatic driving system, the automatic driving control of the vehicle is performed based on the traveling plan having the higher reliability out of the first traveling plan and the second traveling plan. The first traveling plan is generated by using all of the recognized position of the vehicle, the recognized surrounding environment of the vehicle, and the recognized state of the vehicle. For this reason, for example, in a case where the reliability of the recognition result of any one of the recognized position of the vehicle, the recognized surrounding environment of the vehicle, and the recognized state of the vehicle decreases, the reliability of the first traveling plan generated using all of these results decreases. On the other hand, the second traveling plan is generated based on a smaller number of recognition results than those used when the first traveling plan is generated. Since the second traveling plan is generated based on a smaller number of recognition results than the first traveling plan, in a case of generating the second traveling plan without using the recognition result with decreased reliability, the second traveling plan is generated without being affected by the decrease in reliability of the recognition result. In a case where the second traveling plan is generated in this way, since the recognition result with decreased reliability is not used, the reliability of the second traveling plan does not decrease due to the decrease in reliability of the recognition result. For this reason, when the reliability of the first traveling plan decreases, the automatic driving control based on the first traveling plan becomes difficult, and a driving operation is taken over to the driver, the second traveling plan is selected. In this way, even if a situation occurs in which the automatic driving control based on the first traveling plan becomes difficult and the driving operation is taken over to the driver, while the driver is taking over the driving operation, the automatic driving control of the vehicle is continued based on the second traveling plan. As described above, in the automatic driving system, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver.

In the first aspect of the disclosure, the electronic control unit may be configured to generate the second traveling plan based on the state of the vehicle among the recognized position of the vehicle, the recognized surrounding environment of the vehicle, and the recognized state of the vehicle.

In the first aspect of the disclosure, the electronic control unit may be configured to generate the second traveling plan such that at least one of an amount of change in acceleration or deceleration of the vehicle per unit time, or an amount of change in steering of the vehicle per unit time is smaller in the second traveling plan than in the first traveling plan.

In the first aspect of the disclosure, the automatic driving system may further include a notification unit configured to give notification to a driver such that the driver takes over a driving operation when the second traveling plan is selected by the electronic control unit.

In the first aspect of the disclosure, the automatic driving system may further include a notification unit and a driver state management unit. The driver state management unit may be configured to manage attention of a driver to the traveling of the vehicle by giving notification to the driver through the notification unit based on a detection result of a detector configured to detect a state of the driver of the vehicle. The electronic control unit may be configured to calculate reliability of the driver state management unit based on at least one of reliability of the detection result of the detector, a state of the detector, a state of the notification unit, a state of the driver state management unit, and management circumstances of the attention of the driver, and correct the reliability of the first traveling plan based on the reliability of the driver state management unit.

A second aspect of the disclosure provides an automatic driving system of a vehicle. The automatic driving system of the vehicle according to the second aspect includes an actuator and an electronic control unit. The actuator is configured to control traveling of the vehicle. The electronic control unit is configured to recognize a position of the vehicle based on a detection result of an external sensor or reception information of a receiver, the external sensor being mounted in the vehicle, and the external sensor being configured to detect external circumstances of the vehicle, recognize a surrounding environment of the vehicle based on the detection result of the external sensor, recognize a state of the vehicle based on a detection result of an internal sensor configured to detect the state of the vehicle, generate a first traveling plan of the vehicle based on the recognized position of the vehicle, the recognized surrounding environment of the vehicle, and the recognized state of the vehicle, calculate reliability of the first traveling plan based on at least one of reliability of the recognized position of the vehicle, reliability of recognition of the recognized surrounding environment of the vehicle, reliability of recognition of the recognized state of the vehicle, or the generated first traveling plan, generate a second traveling plan based on the recognized position of the vehicle, the recognized surrounding environment of the vehicle, and the recognized state of the vehicle such that an amount of change in acceleration or deceleration of the vehicle per unit time, or an amount of change in steering of the vehicle per unit time is smaller in the second traveling plan than in the first traveling plan, calculate reliability of the second traveling plan based on at least one of the reliability of the recognized position of the vehicle, the reliability of recognition of the recognized surrounding environment of the vehicle, the reliability of recognition of the recognized state of the vehicle, and the generated second traveling plan and perform correction to lower the calculated reliability of the second traveling plan, select a traveling plan having the higher reliability out of the first traveling plan and the second traveling plan, and control the traveling of the vehicle by the actuator based on the selected traveling plan.

In this automatic driving system, the automatic driving control of the vehicle is performed based on the traveling plan having the higher reliability out of the first traveling plan and the second traveling plan. The first traveling plan is generated by all of the recognized position of the vehicle, the recognized surrounding environment of the vehicle; and the recognized state of the vehicle. For example, in a case where the reliability of the recognition result of any one of the recognized position of the vehicle, the recognized surrounding environment of the vehicle, and the recognized state of the vehicle, the reliability of the first traveling plan decreases with the decrease in reliability of the recognition result. The second traveling plan is generated by using the same recognition results as used when the first traveling plan is generated, but the second traveling plan in which at least one of the amount of change in acceleration/deceleration or the amount of change in steering of the vehicle per unit time is smaller than that in the first traveling plan. That is, the second traveling plan is generated for making the vehicle travel without significantly changing the state of the vehicle compared to the first traveling plan. In a case where the state of the vehicle is not significantly changed, for example, it is possible to generate the traveling plan even if the recognition accuracy of the surrounding environment of the vehicle is low compared to a case where the state of the vehicle is significantly changed. For this reason, the second traveling plan can be generated even if the reliabilities of the recognition results are low, compared to a case where the first traveling plan is generated. Furthermore, since it is possible to generate the second traveling plan even if the reliability of the recognition result is low, the reliability of the second traveling plan is less affected compared to the first traveling plan even if the reliability of the recognition result decreases. For this reason, even if a situation occurs in which the reliability of the first traveling plan decreases with a decrease in reliability of the recognition result of any one of the position recognition unit, the environment recognition unit, and the vehicle state recognition unit, the automatic driving control based on the first traveling plan becomes difficult, and the driving operation is taken over to the driver, while the driver is taking over the driving operation, the automatic driving control of the vehicle is continued based on the second traveling plan. In this way, in the automatic driving system, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver.

In the second aspect of the disclosure, the automatic driving system according to the second aspect may further include a notification unit configured to give notification to a driver such that the driver takes over a driving operation when the second traveling plan is selected by the electronic control unit.

In the second aspect of the disclosure, the automatic driving system may further include a notification unit and a driver state management unit. The driver state management unit may be configured to manage attention of a driver to the traveling of the vehicle by giving notification to the driver through the notification unit based on a detection result of a detector configured to detect a state of the driver of the vehicle. The electronic control unit may be configured to calculate reliability of the driver state management unit based on at least one of reliability of the detection result of the detector, a state of the detector, a state of the notification unit, a state of the driver state management unit, and management circumstances of the attention of the driver, and correct the reliability of the first traveling plan based on the reliability of the driver state management unit.

A third aspect of the disclosure provides an automatic driving system of a vehicle. The automatic driving system of the vehicle according to the third aspect includes an actuator and an electronic control unit. The actuator is configured to control traveling of the vehicle, The electronic control unit is configured to recognize a position of the vehicle based on a detection result of an external sensor or reception information of a receiver, the external sensor being mounted in the vehicle, and the external sensor being configured to detect external circumstances of the vehicle, recognize a surrounding environment of the vehicle based on the detection result of the external sensor, recognize a state of the vehicle based on a detection result of an internal sensor configured to detect the state of the vehicle, generate a first traveling plan of the vehicle based on the recognized position of the vehicle, the recognized surrounding environment of the vehicle, and the recognized state of the vehicle, calculate reliability of the first traveling plan based on at least one of reliability of the recognized position of the vehicle, reliability of recognition of the recognized surrounding environment of the vehicle, reliability of recognition of the recognized state of the vehicle, or the generated first traveling plan, generate a second traveling plan based on a previous first traveling plan, calculate reliability of the second traveling plan based on reliability of the previous first traveling plan used when generating the second traveling plan, select a traveling plan having the higher reliability out of the first traveling plan and the second traveling plan, and control the traveling of the vehicle by the actuator based on the selected traveling plan.

In this automatic driving system, the automatic driving control of the vehicle is performed based on the traveling plan having the higher reliability out of the first traveling plan and the second traveling plan. The first traveling plan is generated by using the recognition results all of the recognized position of the vehicle, the recognized surrounding environment of the vehicle, and the recognized state of the vehicle. For example, in a case where the reliability of the recognized position of the vehicle, the recognized surrounding environment of the vehicle, and the recognized state of the vehicle decreases, the reliability of the first traveling plan decreases immediately with the decrease in reliability of the recognition result. The second traveling plan is generated based on the first traveling plan previously generated. The reliability of the second traveling plan is calculated based on the reliability of the first traveling plan previously generated, and thus, even if the reliability of the recognition result of the recognized position or the like decreases, the reliability of second traveling plan does not decrease immediately. For this reason, in a case where the reliability of the first traveling plan decreases, the second traveling plan is selected. Accordingly, even if a situation occurs in which the reliability of the first traveling plan decreases, the automatic driving control based on the first traveling plan becomes difficult, and the driving operation is taken over to the driver, while the driver is taking over the driving operation, the automatic driving control of the vehicle is continued based on the second traveling plan. Since the second traveling plan is generated based on the first traveling plan previously generated, in general, the reliability of the second traveling plan becomes low. However, the automatic driving control is continued based on the second traveling plan even if reliability is low, instead of stopping the automatic driving control when the automatic driving control based on the first traveling plan becomes difficult, whereby it is possible to secure the time until the driver takes over the driving operation. In this way, in the automatic driving system, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver.

In the third aspect of the disclosure, the electronic control unit may be configured to calculate the reliability of the first traveling plan each time when the first traveling plan is generated, acquire the reliability of the first traveling plan each time when the reliability of the first traveling plan is calculated, and when the acquired reliability of the first traveling plan is equal to or less than a predetermined value, use the last first traveling plan acquired before the first traveling plan having the reliability equal to or less than the predetermined value, as the second traveling plan.

In the third aspect of the disclosure, the electronic control unit may be configured to calculate the reliability of the first traveling plan each time when the first traveling plan is generated, acquire the reliability of the first traveling plan each time when the reliability of the first traveling plan is calculated, and use first traveling plan having the highest reliability among first traveling plans acquired from a predetermined time before present to the present, as the second traveling plan.

In the third aspect of the disclosure, the electronic control unit may be configured to generate the second traveling plan such that at least one of an amount of change in acceleration or deceleration of the vehicle per unit time, or an amount of change in steering of the vehicle per unit time is smaller in the second traveling plan than in the first traveling plan.

In the third aspect of the disclosure, the automatic driving system may further include a notification unit configured to give notification to a driver such that the driver takes over a driving operation when the second traveling plan is selected by the electronic control unit.

In the third aspect of the disclosure, the automatic driving system may further include a notification unit and a driver state management unit. The driver state management unit may be configured to manage attention of a driver to the traveling of the vehicle by giving notification to the driver through the notification unit based on a detection result of a detector configured to detect a state of the driver of the vehicle. The electronic control unit may be configured to calculate reliability of the driver state management unit based on at least one of reliability of the detection result of the detector, a state of the detector, a state of the notification unit, a state of the driver state management unit, and management circumstances of the attention of the driver, and correct the reliability of the first traveling plan based on the reliability of the driver state management unit.

For example, the first traveling plan is generated on an assumption that the reliability of the driver state management unit is high. For this reason, in a case where the reliability of the driver state management unit decreases, the reliability of the first traveling plan is corrected to be lowered, whereby the second traveling plan is easily selected. In this way, the reliability of the first traveling plan is corrected based on the reliability of the driver state management unit, whereby the automatic driving control of the vehicle is prevented from being performed based on the first traveling plan. Even in a case of ending the automatic driving control based on the first traveling plan with the decrease in reliability of the driver state management unit, the automatic driving control is performed based on the second traveling plan, and thus, it is possible to secure a long time for taking over the driving operation to the driver.

According to various aspects of the present disclosure, in a case of taking over the driving operation to the driver, it is possible to secure a long time for taking over the driving operation to the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
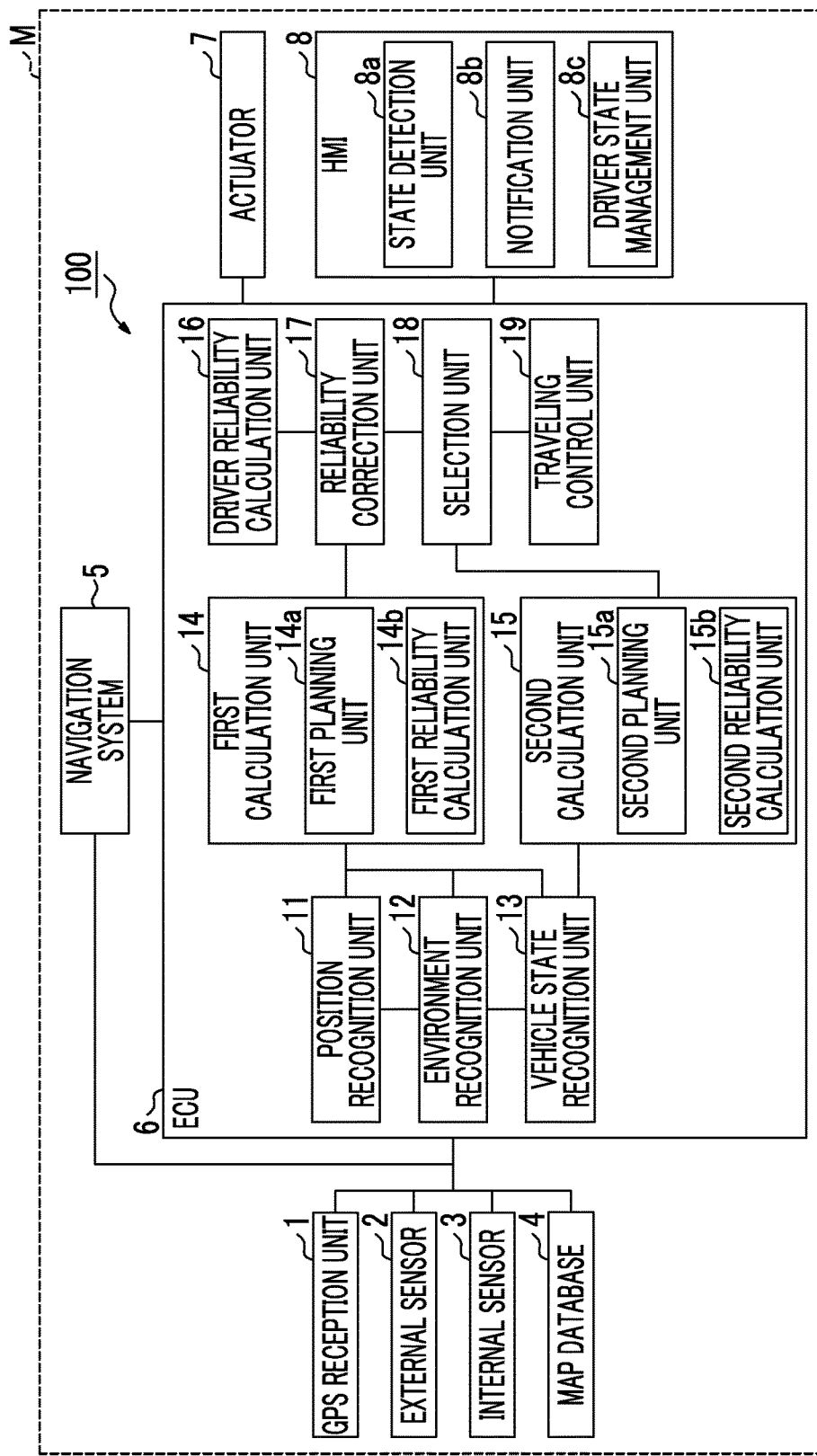
FIG. 1 is a diagram showing the schematic configuration of an automatic driving system according to an embodiment.

Hereinafter, an embodiment of the present disclosure will be described referring to the drawings. In the description of the drawings, the same elements are represented by the same reference numerals, and overlapping description will not be repeated.

As shown in FIG. 1, an automatic driving system 100 is mounted in a vehicle M, such as a passenger vehicle, and is a system for performing automatic driving control of the vehicle M. The automatic driving system 100 determines whether or not automatic driving is possible, and in a case where it is determined that automatic driving is possible and in a case where a start operation (an operation to press a start button of the automatic driving control, or the like) of the automatic driving control by a driver is performed, starts the automatic driving control of the vehicle M. The automatic driving control is vehicle control for making the vehicle M automatically travel along a target route set in advance. In the automatic driving control, the driver does not need to perform a driving operation, and the vehicle M travels automatically. The target route is a route on a map along which the vehicle M travels in the automatic driving control.

The automatic driving system 100 includes an electronic control unit 6 [ECU] for executing the automatic driving control. The ECU 6 is an electronic control unit having a central processing unit [CPU], a read only memory [ROM], a random access memory [RAM], a controller area network [CAN] communication circuit, and the like. In the ECU 6, a program stored in the ROM is loaded on the RAM, and the CPU executes the program loaded on the RAM to realize various functions. The ECU 6 may be constituted of a plurality of electronic control units. A GPS reception unit 1, an external sensor 2, an internal sensor 3, a map database 4, a navigation system 5, an actuator 7, and a human machine interface [HMI] 8 are connected to the ECU 6 through the CAN communication circuit.

The GPS reception unit 1 is mounted in the vehicle M, and functions as a position measurement unit which measures the position of the vehicle M. The GPS reception unit 1 receives signals from three or more GPS satellites to measures the position of the vehicle M (for example, the latitude and longitude of the vehicle M). The GPS reception unit 1 transmits information regarding the measured position of the vehicle M to the ECU 6.

The external sensor 2 is a detection device for detecting external circumstances or the like around the vehicle M. The external sensor 2 includes at least one of a camera, a radar, or a laser imaging detection and ranging [LIDAR]. The external sensor 2 is used for white line recognition of a traveling lane of the vehicle M described below. The external sensor 2 may be used to measure the position of the vehicle M.

The camera is an imaging device which images the external circumstances of the vehicle. The camera is provided on the rear side of a front glass of the vehicle M. The camera may also be provided on the right and left side surfaces of the vehicle M and the rear surface of the vehicle. The camera transmits imaging information obtained by capturing an image in front of the vehicle M to the ECU 6. The camera may be a monocular camera or a stereo camera. The stereo camera has two imaging units provided to reproduce binocular parallax. Imaging information of the stereo camera includes information regarding a depth direction.

The radar detects obstacles around the vehicle M using electric waves (for example, millimeter waves). The radar transmits electric waves around the vehicle M and receives electric waves reflected by obstacles to detect obstacles. The radar transmits detected obstacle information to the ECU 6. Examples of the obstacles include fixed obstacles, such as curbstones, telegraph poles, poles, guardrails, walls, buildings, and signboards and signs provided on a road side, and movable obstacles, such as people, bicycles, and other vehicles.

The lidar detects obstacles outside the vehicle M using light. The lidar transmits light around the vehicle M and receives light reflected by obstacles to measure the distance to a reflection point and to detect obstacles. The lidar transmits detected obstacle information to the ECU 6. The lidar and the radar are not necessarily provided redundantly.

The internal sensor 3 is a detection device which detects the vehicle state of the vehicle M. The internal sensor 3 includes a vehicle speed sensor, an acceleration sensor, and a yaw rate sensor. The vehicle speed sensor is a detector which detects the vehicle speed of the vehicle M. As the vehicle speed sensor, a wheel speed sensor which is provided in a wheel of the vehicle M, a drive shaft rotating integrally with the wheel, or the like and detects the rotation speed of the wheel is used. The vehicle speed sensor transmits detected vehicle speed information to the ECU 6.

The internal sensor 3 may include a steering angle sensor. The steering angle sensor is a sensor which detects the steering angle (actual steering angle) of the vehicle M. The steering angle sensor is provided in a steering shaft of the vehicle M. The steering angle sensor transmits detected steering angle information to the ECU 6.

The acceleration sensor is a detector which detects the acceleration of the vehicle M. The acceleration sensor includes a front-rear acceleration sensor which detects the acceleration of the vehicle M in a front-rear direction, and a lateral acceleration sensor which detects the lateral acceleration of the vehicle M. The acceleration sensor transmits acceleration information of the vehicle M to the ECU 6. The yaw rate sensor is a detector which detects the yaw rate (rotational angular velocity) of the center of gravity of the vehicle M around the vertical axis. As the yaw rate sensor, a gyro sensor may be used. The yaw rate sensor transmits detected yaw rate information of the vehicle M to the ECU 6.

The map database 4 is a database which stores map information. The map information may include positional information of fixed obstacles. The map information may include positional information of white lines provided on roads. The map database 4 is formed in a hard disk drive [HDD] mounted in the vehicle M. The map database 4 may be connected to a server of a map information management center through wireless communication and may update the map information regularly using latest map information stored in a server of the map information management center. The map database 4 is not necessarily mounted in the vehicle M. The map database 4 may be provided in a server or the like communicable with the vehicle M.

The map information may include information in which a switching frequency from the automatic driving control to manual driving is associated with each location. The map information may include information in which the ratio of the traveling time by the manual driving to the traveling time by the automatic driving control is associated with a predetermined area. The position recognition unit 11 or the like of the ECU 6 may recognize from this information that the ratio at which the driver is driving manually is high in a certain area. The map database 4 may store a weather map indicating weather at each location. The map database 4 may store a hazard map indicating locations where hazards (earthquakes, flood hazards, or the like) occur.

The navigation system 5 is mounted in the vehicle M and sets a target route along which the vehicle M travels in the automatic driving control. The navigation system 5 calculates the target route from the position of the vehicle M to a destination based on the destination set in advance, the position of the vehicle M measured by the GPS reception unit 1, and the map information of the map database 4. The destination of the automatic driving control is set by an occupant of the vehicle M who operates an input button (or a touch panel) provided in the navigation system 5. The navigation system 5 may set the target route using a known method. The navigation system 5 may have a function of performing guidance along the target route when the driver manually drives the vehicle M. The navigation system 5 transmits information regarding the target route of the vehicle M to the ECU 6. A part of the functions of the navigation system 5 may be executed by a server in a facility, such as an information processing center, communicable with the vehicle M. The functions of the navigation system 5 may be executed in the ECU 6.

The target route used herein also include a target rout which is automatically generated based on a previous destination history or map information when the driver does not set a destination explicitly, like a traveling route along a road in "DRIVING ASSISTANCE DEVICE" described in Japanese Patent No. 5382218 (WO2011/158347) or "AUTOMATIC DRIVING DEVICE" described in Japanese Patent Application Publication No. 2011-162132 (JP 2011-162132 A).

The actuator 7 is a device which executes traveling control of the vehicle M. The actuator 7 includes at least an engine actuator, a brake actuator, and a steering actuator. The engine actuator controls the amount (throttle opening) of air supplied to the engine in response to a control signal from the ECU 6 and controls the drive force of the vehicle M. In a case where the vehicle M is a hybrid vehicle, in addition to the amount of air supplied to the engine, a control signal from the ECU 6 is input to a motor as a power source and the drive force is controlled. In a case where the vehicle M is an electric vehicle, a control signal from the ECU 6 is input to the motor as a power source and the drive force is controlled.

The brake actuator controls a brake system in response to a control signal from the ECU 6, and controls a braking force applied to the wheel of the vehicle M. As the brake system, a hydraulic brake system may be used. The steering actuator controls the driving of an assist motor controlling steering torque in an electric power steering system in response to a control signal from the ECU 6. With this, the steering actuator controls the steering torque of the vehicle M.

The HMI 8 is an interface for transmission and input of information between an occupant (for example, the driver) of the vehicle M and the automatic driving system 100. The HMI 8 has a function of managing attention of the driver to traveling of the vehicle M. The HMI 8 includes a state detection unit 8a, a notification unit 8b, and a driver state management unit 8c. The state detection unit 8a is a device which detects the state of the driver. The state detection unit 8a includes, for example, a camera which captures the driver, and detects the state (posture, face direction, or the like) of the driver using a known image processing technique or the like. The notification unit 8b is a device which gives notification to the driver. The notification unit 8b includes at least one of a display which displays image information to the driver or an occupant of the vehicle M, or a speaker which outputs sound.

The driver state management unit 8c manages the attention of the driver to the traveling of the vehicle. Managing attention refers to allowing the driver to recognize the traveling state (vehicle speed, steering angle, or the like) of the vehicle M, surrounding circumstances, or the like. For this reason, the driver state management unit 8c manages the attention of the driver by attracting attention through the notification unit 8b based on the state of the driver detected by the state detection unit 8a. For example, in a case where it is detected by the state detection unit 8a that the driver views the side, the driver state management unit 8c gives notification through the notification unit 8b such that the driver is turned to the front. With this, even in a case where the automatic driving control is being performed, it is possible to suppress degradation of the attention of the driver to the traveling of the vehicle M. In a case where the attention of the driver to the traveling of the vehicle M is high, the driver ascertains the traveling state of the vehicle M, the surrounding circumstances, or the like, and thus, it is possible to immediately take over a driving operation from the automatic driving control to manual driving by the driver.

The HMI 8 may give notification that the driver needs to take over the driving operation to the driver through the notification unit 8b in a case where a traveling plan different from the first traveling plan is selected in a state where the first traveling plan is selected in a selection unit 18 described below. That is, in a case where the automatic driving control based on the first traveling plan ends, the HMI 8 may give notification to the driver such that the drive takes over the driving operation. The HMI 8 includes an operation button, a touch panel, or the like which is used when an occupant performs an input operation. The HMI 8 transmits information input from the occupant to the ECU 6.

Next, a functional configuration of the ECU 6 will be described. The ECU 6 includes a position recognition unit 11, an environment recognition unit 12, a vehicle state recognition unit 13, a first calculation unit 14, a second calculation unit 15, a driver reliability calculation unit 16, a reliability correction unit 17, a selection unit 18, and a traveling control unit 19.

The position recognition unit 11 recognizes the position of the vehicle M on the map based on the positional information of the GPS reception unit 1 and the map information of the map database 4. The position recognition unit 11 recognizes the position of the vehicle M as a combination of an x coordinate and a y coordinate in an xy orthogonal coordinate system. The position recognition unit 11 may recognize the position of the vehicle M or may correct the position based on the vehicle speed of the vehicle M recognized by the vehicle state recognition unit 13, in addition to the positional information of the GPS reception unit 1 and the map information of the map database 4. The position recognition unit 11 may recognize the position of the vehicle M using the positional information of the fixed obstacles, such as curbstones, included in the map information of the map database 4 and the detection result of the external sensor 2 by an SLAM technique. In this case, instead of the GPS reception unit 1, the external sensor 2 functions as a position measurement unit. The position recognition unit 11 may recognize the position of the vehicle M or may correct the position using the positional information of the white lines included in the map information and the detection result of the white lines in the external sensor 2 by existing image processing or the like. In this case, the external sensor 2 also functions as a position measurement unit.

The position of the vehicle M may be based on the center position of the vehicle M in a case of being viewed from a vertical direction (in a case of plan view). The center position of the vehicle M is a position which becomes the center of the vehicle M in a vehicle width direction and the center of the vehicle M in a front-rear direction.

The position recognition unit 11 calculates the reliability of the recognized position of the vehicle M. The reliability of the position of the vehicle M represents the accuracy of the recognized position of the vehicle M. For example, the position recognition unit 11 may calculate the reliability of the position of the vehicle M based on a calculation period of the position of the vehicle M. In this case, the position recognition unit 11 may set the reliability of the position of the vehicle M to be lower in a case where the calculation period is longer than a predetermined period than in a case where the calculation period is shorter than the predetermined period.

For example, the position recognition unit 11 may calculate the reliability of the position of the vehicle M based on an acquisition period of the positional information of the GPS reception unit 1, or the like used for recognizing the position of the vehicle M. In this case, the position recognition unit 11 may set the reliability of the position of the vehicle M to be lower in a case where the acquisition period of the positional information of the GPS reception unit 1, or the like is longer than a predetermined period than in a case where the acquisition period is shorter than the predetermined period. For example, the position recognition unit 11 may calculate the reliability of the position of the vehicle M based on change over time in the positional information of the GPS reception unit 1, or the like used for recognizing the position of the vehicle M. In this case, the position recognition unit 11 may set the reliability of the position of the vehicle M to be lower in a case where there is inconsistency in change over time in the positional information of the GPS reception unit 1, or the like (a case where change is discontinuous) than in a case where there is no inconsistency (a case where change is not discontinuous).

For example, the position recognition unit 11 may calculate the reliability of the position of the vehicle M based on an error of recognition when recognizing the position of the vehicle M. In regard to the error, the error is small, for example, in a case where the position of the vehicle M is refined to one point, and the error is large, for example, in a case where the position of the vehicle M is not refined and it is recognized that the vehicle M exists in a certain area. In this case, the position recognition unit 11 may set the reliability of the position of the vehicle M to be lower in a case where the error of recognition of the position of the vehicle M is large than in a case where the error is small. For example, in a case of recognizing the position of the vehicle M using the detection results of fixed structures around the vehicle M, the white lines, and the like, the position recognition unit 11 may calculate the reliability of the position of the vehicle M based on the detection ratio of the fixed structures, the white lines, or the like used for recognition. In this case, the position recognition unit 11 may set the reliability of the position of the vehicle M to be lower in a case where the detection ratio of the fixed structures, the white lines, and the like is low than in a case where the detection ratio is high.

For example, the position recognition unit 11 may calculate the reliability of the position of the vehicle M based on a switching frequency from the automatic driving control to the manual driving associated with each location. The position recognition unit 11 may acquire the switching frequency from the automatic driving control to the manual driving associated with each location based on the map information. In this case, the position recognition unit 11 may set the reliability of the position of the vehicle M to be lower in a case where the recognized position of the vehicle M is a location where the switching frequency from the automatic driving control to the manual driving is high than in a case where the position of the vehicle M is a location where the frequency is low. For example, the position recognition unit 11 may calculate the reliability of the position of the vehicle M based on the ratio of the traveling time by the manual driving to the traveling time by the automatic driving control associated with each predetermined area. The position recognition unit 11 may acquire the ratio of the traveling time by the manual driving to the traveling time by the automatic driving control associated with each predetermined area based on the map information. In this case, the position recognition unit 11 may set the reliability of the position of the vehicle M to be lower in a case where the recognized position of the vehicle M is an area where the ratio of the time of the manual driving is high than in a case where the position of the vehicle M is a location where the ratio is low.

For example, the position recognition unit 11 may calculate the reliability of the position of the vehicle M based on the presence or absence of the map information stored in the map database 4. In this case, the position recognition unit 11 may set the reliability of the position of the vehicle M to be lower when the position of the vehicle M is about to be recognized in an area where there is no map information than in a case where there is the map information. For example, the position recognition unit 11 may calculate the reliability of the position of the vehicle M based on freshness (newness) of the map information stored in the map database 4. In this case, the position recognition unit 11 may set the reliability of the position of the vehicle M to be lower in a case where the time when the map information is updated is old than in a case where the time when the map information is updated is recent.

For example, the position recognition unit 11 may calculate the reliability of the position of the vehicle M based on a weather map indicating weather at each location stored in the map database 4. In this case, the position recognition unit 11 may set the reliability of the position of the vehicle M to be lower in a case where the recognized position of the vehicle M is under bad weather conditions (for example, in a case of rain, snow, or the like) on the weather map than in a case where the position of the vehicle M is not under bad weather conditions (for example, in a case of good weather). For example, the position recognition unit 11 may calculate the reliability of the position of the vehicle M based on a hazard map indicating locations where hazards occur stored in the map database 4. In this case, the position recognition unit 11 may set the reliability of the position of the vehicle M to be lower in a case where the recognized position of the vehicle M is a location where a hazard occurs on the hazard map than in a case where the position of the vehicle M is a location where no hazard occurs.

The position recognition unit 11 may calculate the reliability of the position of the vehicle M based on a plurality of reliabilities calculated based on a plurality of calculation methods of the reliability of the position of the vehicle M described above.

The environment recognition unit 12 recognizes the surrounding environment of the vehicle M based on the detection result of the external sensor 2 detecting the external circumstances of the vehicle M. The environment recognition unit 12 recognizes the surrounding environment of the vehicle M based on the captured images of the camera, the obstacle information or the radar, or the obstacle information of the lidar using a known method. Specifically, the environment recognition unit 12 recognizes obstacles (fixed obstacles and movable obstacles) around the vehicle M based on the captured images of the camera, the obstacle information of the radar, or the obstacle information of the lidar. In a case where a vehicle (another vehicle) is recognized as an obstacle, the environment recognition unit 12 recognizes the type of the recognized vehicle. As the type of vehicle, for example, it is recognized whether a vehicle is an emergency vehicle (a patrol car, an ambulance, a fire engine, or the like) or a vehicle other than an emergency vehicle. For example, in a case of using a camera, the type of vehicle may be distinguished by comparing the recognized shape of the vehicle with the shapes of emergency vehicles determined in advance. In a case where a vehicle (another vehicle) is recognized as an obstacle, the environment recognition unit 12 recognizes the state of the recognized vehicle. As the state of the vehicle, for example, it is recognized whether or not the vehicle turns on a hazard lamp. The environment recognition unit 12 recognizes the positions of the white lines of the traveling lane of the vehicle M based on the imaging information of the camera or the obstacle information of the lidar. The environment recognition unit 12 may further recognize the type of the white lines and the curvature of the white lines.

The environment recognition unit 12 calculates reliability of recognition of the recognized surrounding environment of the vehicle M. The reliability of recognition of the surrounding environment of the vehicle M represents the accuracy of recognition of the recognized surrounding environment of the vehicle M. For example, the environment recognition unit 12 may calculate the reliability of recognition of the surrounding environment of the vehicle M based on a calculation period of recognition of the surrounding environment of the vehicle M. In this case, the environment recognition unit 12 may set the reliability of recognition of the surrounding environment of the vehicle M to be lower in a case where the calculation period is longer than a predetermined period than in a case where the calculation period is shorter than the predetermined period.

For example, the environment recognition unit 12 may calculate the reliability of recognition of the surrounding environment of the vehicle M based on an acquisition period of the detection result of the external sensor 2. In this case, the environment recognition unit 12 may set the reliability of recognition of the surrounding environment of the vehicle M to be lower in a case where the acquisition period of the detection result of the external sensor 2 is longer than a predetermined period than in a case where the acquisition period is shorter than the predetermined period. For example, the environment recognition unit 12 may calculate the reliability of recognition of the surrounding environment of the vehicle M based on change over time in the position or speed of the recognized obstacle. In this case, the environment recognition unit 12 may set the reliability of recognition of the surrounding environment of the vehicle M to be lower in a case where there is inconsistency in change over time in the position or speed of the recognized obstacle (a case where change is discontinuous or there is much noise) than in a case where there is no inconsistency (a case where change is not discontinuous or there is less noise).

For example, the environment recognition unit 12 may calculate the reliability of recognition of the surrounding environment of the vehicle M based on, when change over time of the recognized obstacle is observed, the number of divisions or combinations of the obstacle. In this case, the environment recognition unit 12 may set the reliability of recognition of the surrounding environment of the vehicle M to be lower in a case where the number of divisions or combinations of the obstacle is large than in a case where the number of divisions or combinations of the obstacle is small.

For example, the environment recognition unit 12 may calculate the reliability of recognition of the surrounding environment of the vehicle M based on the ratio of obstacles with the types thereof identified among a plurality of obstacles around the vehicle M. In this case, the environment recognition unit 12 may set the reliability of recognition of the surrounding environment of the vehicle M to be lower in a case where the ratio of the obstacles with the type thereof identified is small than in a case where the ratio of the obstacles with the type thereof identified is large. For example, the environment recognition unit 12 may calculate the reliability of recognition of the surrounding environment of the vehicle M based on the number of pedestrians within a predetermined distance (Pm) from the vehicle M among the recognized obstacles. In this case, the environment recognition unit 12 may set the reliability of recognition of the surrounding environment of the vehicle M to be lower in a case where the number of pedestrians within a predetermined distance is large than in a case where the number of pedestrians is small. Similarly to the case of the pedestrians, the environment recognition unit 12 may calculate the reliability of recognition of the surrounding environment of the vehicle M based on the number of obstacles other than pedestrians within a predetermined distance (P m) from the vehicle M among the obstacles other than the pedestrians. In this case, the environment recognition unit 12 may set the reliability of recognition of the surrounding environment of the vehicle M to be lower in a case where the number of obstacles other than pedestrians within the predetermined distance is large than in a case where the number of obstacles other than pedestrians is small.

The environment recognition unit 12 may calculate the reliability of recognition of the surrounding environment of the vehicle M based on the width of the traveling lane of the vehicle M. In this case, the environment recognition unit 12 calculates the width of the traveling lane based on the recognized positions of the white lines of the traveling lane of the vehicle M. Then, the environment recognition unit 12 may set the reliability of recognition of the surrounding environment of the vehicle M to be lower in a case where the calculated width is narrow than in a case where the width is wide. Although the environment recognition unit 12 calculates the width based on the recognized white lines and calculates the reliability of recognition of the surrounding environment of the vehicle M based on the calculated width, the present disclosure is not limited to a case where the environment recognition unit 12 calculates the width. For example, in a case where information regarding the width of the lane is included in the map database 4, the environment recognition unit 12 may acquire the width of the lane from the map database 4 based on the position of the vehicle M recognized by the position recognition unit 11. Then, the environment recognition unit 12 may calculate the reliability of recognition of the surrounding environment of the vehicle M based on the width acquired from the map database 4. The environment recognition unit 12 may calculate the width of the traveling lane based on, for example, the positions of physical road boundaries (curbstones, guardrails, walls, pylons for construction, or the like), other than the positions of the white lines of the traveling lane. Other than the white lines and the physical road boundaries, in a case where an object which can be regarded as a road width, for example, an oncoming vehicle comes on a road with no center line, the environment recognition unit 12 may regard half the physical width of the road obtained based on the position of the oncoming vehicle as the width of the traveling lane. Alternatively, for example, in a case where a pedestrian or the like is walking on a shoulder of a road with no road mark, the environment recognition unit 12 may calculate a virtual width based on a position where a sufficient distance is secured from the pedestrian. The environment recognition unit 12 may calculate the reliability of recognition of the surrounding environment of the vehicle M based on the distance between the vehicle M and the road boundary. The road boundary may be division lines, such as white lines, may be the ends of a travelable area determined by curbstones, walls, or side drains, or other objects suited to be handled as a road boundary.

For example, the environment recognition unit 12 may calculate the reliability of recognition of the surrounding environment of the vehicle M based on whether or not a recognized vehicle around the vehicle M is an emergency vehicle. In this case, the environment recognition unit 12 may set the reliability of recognition of the surrounding environment of the vehicle M to be lower in a case whether the ratio or the number of emergency vehicles around the vehicle M is large than in a case where the ratio or the number of emergency vehicles is small. For example, the environment recognition unit 12 may calculate the reliability of recognition of the surrounding environment of the vehicle M based on whether or not a recognized vehicle around the vehicle M is turning on a hazard lamp. In this case, the environment recognition unit 12 may set the reliability of recognition of the surrounding environment of the vehicle M to be lower in a case where the ratio or the number of vehicles around the vehicle M which are turning on the hazard lamp is large than in a case where the ratio or the number of vehicles which are turning on the hazard lamp is small.

The environment recognition, unit 12 may calculate the reliability of recognition of the surrounding environment of the vehicle. M based on a plurality of reliabilities calculated based on a plurality of calculation methods of the reliability of recognition of the surrounding environment of the vehicle M described above.

The vehicle state recognition unit 13 recognizes the state of the vehicle M including the vehicle speed, the direction, and the like of the vehicle M based on the detection result of the internal sensor 3. Specifically, the vehicle state recognition unit 13 recognizes the vehicle speed of the vehicle M based on the vehicle speed information of the vehicle speed sensor. The vehicle state recognition unit 13 recognizes the direction of the vehicle M based on the yaw rate information of the yaw rate sensor. The vehicle state recognition unit 13 recognizes the acceleration of the vehicle M based on the acceleration information of the acceleration sensor. The vehicle state recognition unit 13 recognizes the steering angle (actual steering angle) of the vehicle M based on the steering angle information of the steering angle sensor.

The vehicle state recognition unit 13 calculates the reliability of recognition of the recognized state of the vehicle M. The reliability of recognition of the state of the vehicle M represents the accuracy of recognition of the recognized state of the vehicle M. For example, the vehicle state recognition unit 13 may calculate the reliability of recognition of the state of the vehicle M based on a calculation period of recognition of the state of the vehicle M. In this case, the vehicle state recognition unit 13 may set the reliability of recognition of the state of the vehicle M to be lower in a case where the calculation period is longer than a predetermined period than in a case where the calculation period is shorter than the predetermined period.

For example, the vehicle state recognition unit 13 may calculate the reliability of recognition of the state of the vehicle M based on an acquisition period of the detection result of the internal sensor 3 used for recognizing the state of the vehicle M. In this case, the vehicle state recognition unit 13 may set the reliability of recognition of the state of the vehicle M to be lower in a case where the acquisition period of the detection result of the internal sensor 3 is longer than a predetermined period than in a case where the acquisition period is shorter than the predetermined period.

The vehicle state recognition unit 13 may calculate the reliability of recognition of the state of the vehicle M based on a plurality of reliabilities calculated based on a plurality of calculation methods of the reliability of recognition of the state of the vehicle M described above.

The first calculation unit 14 calculates the first traveling plan used when performing the automatic driving control of the vehicle M and the reliability of the first traveling plan. The first calculation unit 14 includes a first planning unit 14*a* and a first reliability calculation unit 14*b*.

The first planning unit 14*a* generates the first traveling plan of the vehicle M so as to allow the vehicle M to travel along the target route set by the navigation system 5 based on the position of the vehicle M recognized by the position recognition unit 11, the surrounding environment recognized by the environment recognition unit 12, the state of the vehicle M recognized by the vehicle state recognition unit 13, and the map information of the map database 4. The first planning unit 14*a* starts the generation of the first traveling plan in a case where it is determined in the automatic driving system 100 that the automatic driving is possible and the driver performs the start operation of the automatic driving control. The first traveling plan becomes a traveling plan until the vehicle M reaches the destination set in advance from the current position of the vehicle M.

The first planning unit 14*a* generates the first traveling plan such that the vehicle M travels suitably on the target route in light of the criteria, such as safety, compliance, and traveling efficiency. The first traveling plan includes, for example, a driving behavior, such as obstacle avoidance or lane change, in addition to following a preceding vehicle and steering along the shape of the traveling lane. The first traveling plan is generated on an assumption that the HMI 8 is operated normally and the attention of the driver is managed by the driver state management unit 8c as appropriate. The first planning unit 14a generates, as the first traveling plan, for example, a traveling plan including a plurality of target positions along the target route and the speed at each target position. That is, the first traveling plan includes a plan for a route and a plan for a speed.

The first reliability calculation unit 14b calculates the reliability of the first traveling plan generated by the first planning unit 14a. The reliability of the first traveling plan represents the degree of whether or not the vehicle M is able to travel suitably in light of the criteria, such as safety, compliance, and traveling efficiency. The reliability of the first traveling plan being high represents that, for example, the vehicle M is able to travel while maintaining the distance from surrounding obstacles to be equal to or greater than a predetermined distance, or the traveling efficiency is satisfactory. The traveling efficiency being satisfactory means that, for example, a travelable distance per unit time is long. Alternatively, the traveling efficiency being satisfactory may include a case where fuel efficiency is satisfactory, or the like.

Specifically, the first reliability calculation unit 14b calculates the reliability of the first traveling plan based on at least one of the reliability of the position of the vehicle M recognized by the position recognition unit 11, the reliability of recognition of the surrounding environment of the vehicle M recognized by the environment recognition unit 12, the reliability of recognition of the state of the vehicle M recognized by the vehicle state recognition unit 13, or the first traveling plan generated by the first planning unit 14a.

For example, the first reliability calculation unit 14b may calculate the reliability of the first traveling plan based on a generation period of the first traveling plan in the first planning unit 14a. In this case, the first reliability calculation unit Mb may set the reliability of the first traveling plan to be lower in a case where the generation period of the first traveling plan is longer than a predetermined period than in a case where the generation period is shorter than the predetermined period.

For example, the first reliability calculation unit 14b may calculate the reliability of the first traveling plan based on various reliabilities calculated by the position recognition unit 11, the environment recognition unit 12, and the vehicle state recognition unit 13. In this case, the first reliability calculation unit 14b may set the reliability of the first traveling plan to be lower in a case where the reliability of the position of the vehicle M calculated by the position recognition unit 11 is low than in a case where the reliability of the position of the vehicle M is high. The first reliability calculation unit 14b may set the reliability of the first traveling plan to be lower in a case where the reliability of recognition of the surrounding environment of the vehicle M calculated by the environment recognition unit 12 is low than in a case where the reliability of recognition of the surrounding environment of the vehicle M is high. The first reliability calculation unit 14b may set the reliability of the first traveling plan to be lower in a case where the reliability of recognition of the state of the vehicle M calculated by the vehicle state recognition unit 13 is low than in a case where the reliability of recognition of the state of the vehicle M is high.

For example, the first reliability calculation unit 14b may calculate the reliability of the first traveling plan based on the number of obstacles around the route in the first traveling plan. In this case, the first reliability calculation unit 14b may set the reliability of the first traveling plan to be lower based on the generated first traveling plan and the surrounding environment recognized by the environment recognition unit 12 in a case where the number of obstacles around the route in the first traveling plan is large than in a case where the number of obstacles is small. For example, the first reliability calculation unit 14b may calculate the reliability of the first traveling plan based on the distance between an obstacle around the router in the first traveling plan and the vehicle M. In this case, the first reliability calculation unit 14b may set the reliability of the first traveling plan to be lower based on the generated first traveling plan and the surrounding environment recognized by the environment recognition unit 12 in a case where the distance between the obstacle around the route in the first traveling plan and the vehicle M is less than a predetermined distance than in a case where the distance between the obstacle and the vehicle M is equal to or greater than the predetermined distance.

For example, the first reliability calculation unit 14b may calculate the reliability of the first traveling plan based on the route in the first traveling plan, an obstacle recognized by the environment recognition unit 12, and a physical blind area of the external sensor 2 caused by the obstacle. The physical blind area of the external sensor 2 refers to an area where an obstacle is not detectable by the external sensor 2 due to the existence of the obstacle even though the area is a detection area of the external sensor 2. The detection area of the external sensor 2 is determined in advance based on the direction in which the external sensor 2 is installed in the vehicle M, or the like. A specific example of the physical blind area of the external sensor 2 will be described. For example, it is assumed that a road in front of the vehicle M is a curved road and a building exists near the road in front. Then, a situation in which the building exists on the tip of the curve from a front side (vehicle M side) and a portion of the tip of the curve is hidden by the building and is not viewed from the vehicle M is assumed. In this case, the building near the road is blocked and the tip of the curve is not detectable by the external sensor 2. An area (an area not detectable by the external sensor 2) blocked by the building becomes a physical blind area of the external sensor 2. In this case, the first reliability calculation unit 14b may set the reliability of the first traveling plan to be lower in a case where the blind area of the external sensor 2 is large than in a case where the blind area is small.

For example, the first reliability calculation unit 14b may calculate the reliability of the first traveling plan based on the route in the first traveling plan, the map information of the map database 4, and the sensor blind area of the external sensor 2. The sensor blind area of the external sensor 2 refers to an area which is not the detection area of the external sensor 2 originally. In addition, the sensor blind area of the external sensor 2 refers to an area which does not become the detection area of the external sensor 2 originally even though the area is an area to be detected by the external sensor 2 in a case of traveling according to the first traveling plan. For example, in a case where there is a lane which joins the traveling route (the route in the first traveling plan) of the vehicle M from the side, the lane joined from the side becomes an area to be detected by the external sensor 2. Then, in a case where the detection area of the external sensor 2 provided in the vehicle M is only an area in front, the lane joined from the side is different in the direction of detection, and thus, is not detectable by the external sensor 2. For this reason, the lane joined from the side becomes the sensor blind area of the external sensor 2. In this case, the first reliability calculation unit 14b may set the reliability of the first traveling plan to be lower in a case where the sensor blind area is large than in a case where the sensor blind area is small.

For example, the first reliability calculation unit 14b may calculate the reliability of the first traveling plan based on the number of lane changes of the vehicle M or the number of joins or the like of the traveling lanes obtained based on the route in the first traveling plan and the map information of the map database 4. In this case, the first reliability calculation unit 14b may set the reliability of the first traveling plan to be lower in a case where the number of lane changes of the vehicle M or the number of joins or the like of the traveling lane is large than in a case where the number of lane changes or the number of joins is small.

For example, the first reliability calculation unit 14b may calculate the reliability of the first traveling plan based on the degree of coincidence between generated first traveling plan and a pattern of a traveling plan determined in advance capable of allowing safe traveling. In this case, the first reliability calculation unit 14b may set the reliability of the first traveling plan to be lower in a case where the degree of coincidence between the generated first traveling plan and the pattern of the traveling plan determined in advance capable of allowing safe traveling is low than in a case where the degree of coincidence is high. For example, in a case where the first traveling plan includes a join into a priority road, the first reliability calculation unit 14b may set the reliability of the first traveling plan to be low.

For example, the first reliability calculation unit 14b may calculate the reliability of the first traveling plan based on the degree of coincidence between the recognition result of the position recognition unit 11, the recognition result of the environment recognition unit 12, and the recognition result of the vehicle state recognition unit 13 used when generating the first traveling plan and conditions determined in advance capable of stably generating a traveling plan. In this case, the first reliability calculation unit 14b may set the reliability of the first traveling plan to be lower in a case where the degree of coincidence between the recognition result of the position-recognition unit 11, and the like used when generating the first traveling plan and the conditions determined in advance is low than in a case where the degree of coincidence is high.

For example, the first reliability calculation unit 14b may calculate the reliability of the first traveling plan based on the degree of coincidence between the movement of a vehicle around the vehicle M recognized by the environment recognition unit 12 and the movement of the vehicle M in the generated first traveling plan. In this case, the first reliability calculation unit 14b may set the reliability of the first traveling plan to be low in a case where the degree of coincident between the movement of the surrounding vehicle and the movement of the vehicle M in the first traveling plan. For example, in a case where the movement of the vehicle M in the first traveling plan continues to be stopped at an intersection where a traffic signal exists even though the surrounding vehicle starts, the first reliability calculation unit 14b sets the reliability of the first traveling plan to be low.

The first reliability calculation unit 14b may calculate the reliability of the first traveling plan based on a plurality of reliabilities calculated based on a plurality of calculation methods of the reliability of the first traveling plan described above.

The second calculation unit 15 calculates the second traveling plan used when performing the automatic driving control of the vehicle M and the reliability of the second traveling plan. The second calculation unit 15 generates the second traveling plan using a method different from the first calculation unit 14. The second calculation unit 15 includes a second planning unit 15a and a second reliability calculation unit 15b.

The second planning unit 15a generates, as the second traveling plan, a traveling plan for easily taking over the driving operation to the driver from a state where the automatic driving control is performed based on the second traveling plan. Specifically, a traveling plan in which the state of the vehicle M is not changed significantly per unit time is obtained. Unlike the first traveling plan, the second traveling plan does not include, for example, a driving behavior, such as obstacle avoidance and lane change. If the movement of the vehicle M is gradual as in a case where the vehicle M travels based on the second traveling plan, when the driving operation is taken over to the driver, it is possible to allow the driver to easily adapt himself/herself to the state of the vehicle M when the driving operation is taken over. That is, in a case where the automatic driving control of the vehicle M is performed based on the second traveling plan, it is possible to allow the driver to easily take over the driving operation from a state where the automatic driving is performed.

The second planning unit 15a generates the second traveling plan of the vehicle M based on the state of the vehicle M recognized by the vehicle state recognition unit 13. Specifically, the second planning unit 15a generates the second traveling plan from the current state of the vehicle M (vehicle speed, acceleration, steering angle, and the like) recognized by the vehicle state recognition unit 13 such that at least one of the amount of change in acceleration/deceleration or the amount of change in steering of the vehicle M per unit time is smaller than a value determined in advance. That is, the second traveling plan becomes a traveling plan in which the movement of the vehicle M is not changed significantly from the current state of the vehicle M. In this way, the second planning unit 15a may generate, as the second traveling plan, a traveling plan which is more gradual than the first traveling plan generated by the first planning unit 14a. For example, the second planning unit 15a generates the second traveling plan in which the vehicle M is reduced in speed from the current vehicle speed of the vehicle M at a deceleration smaller than a value determined in advance. In this way, the second planning unit 15a generates the second traveling plan only using the recognition result in the vehicle state recognition unit 13 without using the recognition results in the position recognition unit 11 and the environment recognition unit 12.

The second planning unit 15a generates, as the second traveling plan, a traveling plan including, for example, a plurality of target positions where the vehicle M travels and a speed at each target position like the first traveling plan. That is, the second traveling plan includes a plan for a route and a plan for a speed. The second planning unit 15a starts the generation of the second traveling plan in a case where the driver performs the start operation of the automatic driving control.

The second reliability calculation unit 15b calculates the reliability of the second traveling plan generated by the second planning unit 15a. The reliability of the second traveling plan represents the degree of whether or not the vehicle M can travel suitably in light of the criteria, such as safety, compliance, and traveling efficiency. Unlike the first traveling plan, the second traveling plan does not take the surrounding environment and the like into consideration.

For this reason, in general, the reliability of the second traveling plan is lower than the reliability of the first traveling plan.

Specifically, the second reliability calculation unit 15b calculates the reliability of the second traveling plan based on at least one of the reliability of the recognition result used when the second planning unit 15a generates the second traveling plan or the second traveling plan. The second reliability calculation unit 15b calculates the reliability of the second traveling plan based on at least one of the reliability of recognition of the state of the vehicle M recognized by the vehicle state recognition unit 13 or the second traveling plan generated by the second planning unit 15a.

For example, the second reliability calculation unit 15b may calculate the reliability of the second traveling plan based on a generation period of the second traveling plan in the second planning unit 15a. In this case, the second reliability calculation unit 15b may set the reliability of the second traveling plan to be lower in a case where the generation period of the second traveling plan is longer than a predetermined period than in a case where the generation period is shorter than the predetermined period. For example, the second reliability calculation unit 15b may calculate the reliability of the second traveling plan based on the reliability of recognition of the state of the vehicle M calculated by the vehicle state recognition unit 13. In this case, second reliability calculation unit 15b may set the reliability of the second traveling plan to be lower in a case where the reliability of recognition of the state of the vehicle M calculated by the vehicle state recognition unit 13 is low than in a case where the reliability of recognition of the state of the vehicle M is high.

The second reliability calculation unit 15b may calculate the reliability of the second traveling plan based on a plurality of reliabilities calculated based on a plurality of calculation methods of the reliability of the second traveling plan described above.

The driver reliability calculation unit 16 calculates the reliability of the driver state management unit 8c based on at least one of the reliability of detection of the state detection unit 8a, the state of the state detection unit 8a, the state of the notification unit 8b, the state of the driver state management unit 8c, or the management circumstances of the attention of the driver in the driver state management unit 8c. The reliability of the driver state management unit 8c represents the degree of whether or not the attention of the driver is managed as appropriate.

For example, the driver reliability calculation unit 16 may calculate the reliability of the driver state management unit 8c based on a detection period of the state of the driver in the state detection unit 8a. For example, the driver reliability calculation unit 16 may set the reliability of the driver state management unit 8c to be lower in a case where the detection period in the state detection unit 8a is longer than a predetermined period than in a case where the detection period is shorter than the predetermined period.

For example, the driver reliability calculation unit 16 may set the reliability of the driver state management unit 8c to be lower in a case where the state detection unit 8a is not operated normally than in a case where the state detection unit 8a is operated normally. The driver reliability calculation unit 16 may set the reliability of the driver state management unit 8c to be lower in a case where the notification unit 8b is not operated normally than in a case where the notification unit 8b is operated normally. The driver reliability calculation unit 16 may set the reliability of the driver state management unit 8c to be lower in a case where the driver state management unit 8c is not operated normally than in a case where the driver state management unit 8c is operated normally.

For example, the driver reliability calculation unit 16 may set the reliability of the driver state management unit 8c to be lower in a case where the attention of the driver is not managed by the driver state management unit 8c as appropriate than in a case where the attention of the driver is managed as appropriate. As a case where the attention of the driver is managed as appropriate, a case where the driver responds to attention attraction through the notification unit 8b, or the driver confirms the traveling state of the vehicle M, the surrounding circumstances, or the like by himself/herself is exemplified. It is possible to determine whether or not the driver responds to attention attraction and confirms the traveling state of the vehicle M or the like based on the detection result of the state detection unit 8a.

The driver reliability calculation unit 16 may calculate the reliability of the driver state management unit 8c based on a plurality of reliabilities calculated based on a plurality of calculation methods of the reliability of the driver state management unit 8c described above.

The reliability correction unit 17 corrects the reliability of the first traveling plan calculated by the first reliability calculation unit 14b based on the reliability of the driver state management unit 8c calculated by the driver reliability calculation unit 16. The reliability correction unit 17 performs correction to lower the reliability of the first traveling plan in a case where the reliability of the driver state management unit 8c is low. For example, in a case where the reliability of the driver state management unit 8c calculated by the driver reliability calculation unit 16 is represented by a value equal to or greater than 0 and equal to or less than 1, the reliability correction unit 17 may correct the reliability of the first traveling plan by multiplying the reliability of the first traveling plan by the value of the reliability of the driver state management unit 8c.

The selection unit 18 compares the reliability of the first traveling plan corrected by the reliability correction unit 17 with the reliability of the second traveling plan calculated by the second reliability calculation unit 15b, and selects a traveling plan having the higher reliability out of the first traveling plan and the second traveling plan.

The traveling control unit 19 executes the automatic driving control of the vehicle M based on the traveling plan selected by the selection unit 18. Specifically, the traveling control unit 19 outputs a control signal according to the traveling plan to the actuator 7. With this, the traveling control unit 19 controls the traveling of the vehicle M such that the vehicle M automatically travels along the traveling plan.

Next, a flow of processing which is executed by the ECU 6 will be described referring to the flowchart of FIG. 2. This processing is executed by the ECU 6 in a case where the execution of the automatic driving control is instructed by the driver of the vehicle M. In a case where the processing of the flowchart reaches the end, the ECU 6 repeats the processing from the start again. The ECU 6 ends the processing shown in FIG. 2 in a case where the execution of the automatic driving control is cancelled by the driver of the vehicle M.

Figure 2:
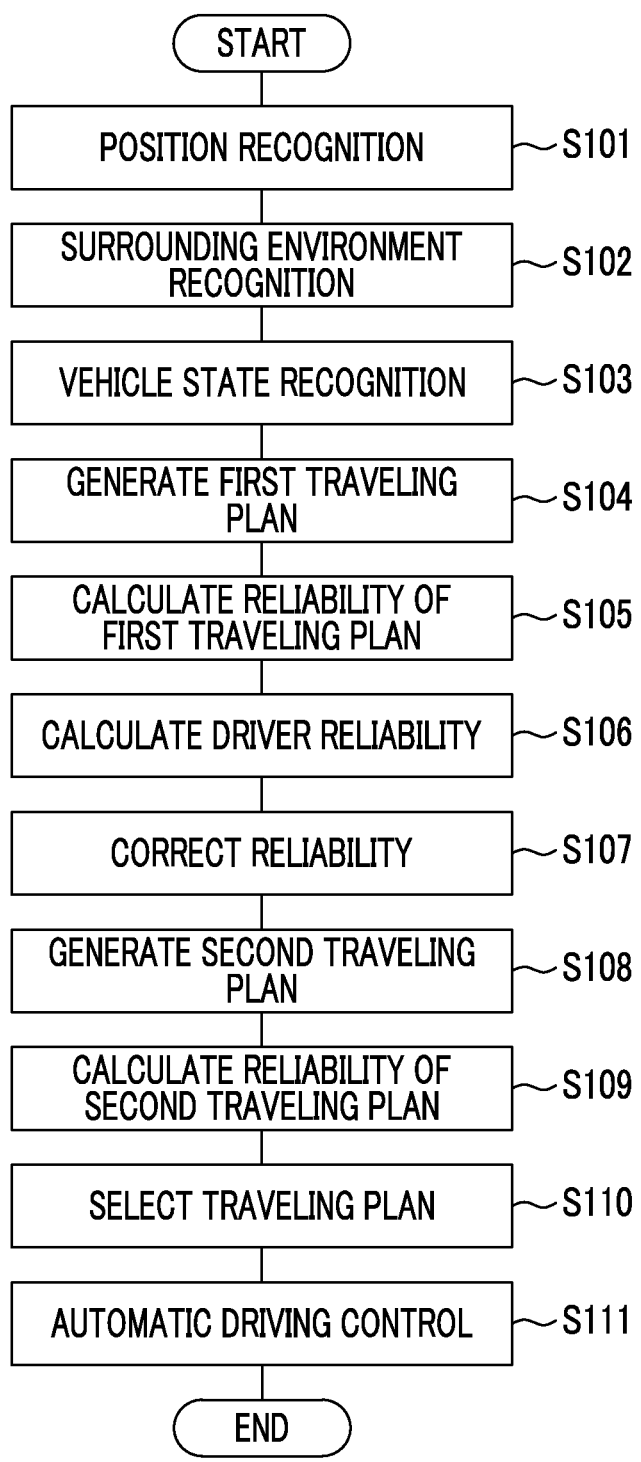
FIG. 2 is a flowchart showing a flow of processing which is executed by an ECU.

As shown in FIG. 2, the position recognition unit 11 recognizes the position of the vehicle M (S101). The environment recognition unit 12 recognizes the surrounding environment of the vehicle M (S102). The vehicle state recognition unit 13 recognizes the state of the vehicle M (S103). The processing order of S101 to S103 is not limited to this order, and the processing may be executed in parallel. The first planning unit 14*a* generates the first traveling plan based on the recognition results of the position recognition unit 11 and the like (S104). The first reliability calculation unit 14*b* calculates the reliability of the generated first traveling plan (S105).

The driver reliability calculation unit 16 calculates the reliability of the driver state management unit 8*c* based on the reliability of detection of the state detection unit 8*a*, and the like (S106). The reliability correction unit 17 corrects the reliability of the first traveling plan based on the reliability of the driver state management unit 8*c* (S107). The second planning unit 15*a* generates the second traveling plan of the vehicle M based on the state of the vehicle M (S108). The second reliability calculation unit 15*b* calculates the reliability of the generated second traveling plan (S109). The processing of S104 to S107 and the processing of S108 and S109 are not limited to a case where the processing of S108 and S109 is performed after the processing of S104 to S107. For example, the processing of S104 to S107 and the processing of S108 and S109 may be executed in parallel.

The selection unit 18 compares the corrected reliability of the first traveling plan with the reliability of the second traveling plan, and selects the traveling plan having the higher reliability (S110). The traveling control unit 19 executes the automatic driving control of the vehicle M based on the traveling plan selected by the selection unit 18 (S111).

This embodiment is configured as above, and in this automatic driving system 100, the traveling control unit 19 performs the automatic driving control of the vehicle M based on the traveling plan having the higher reliability out of the first traveling plan and the second traveling plan. The first planning unit 14*a* generates the first traveling plan using all of the recognition results in the position recognition unit 11, the environment recognition unit 12, and the vehicle state recognition unit 13. For this reason, for example, in a case where the reliability of the recognition result of any one of the position recognition unit 11, the environment recognition unit 12, and the vehicle state recognition unit 13 decreases, the reliability of the first traveling plan generated using all of these results decreases.

The second planning unit 15*a* generate the second traveling plan based on a smaller number of the recognition result than in the first planning unit 14*a*. Specifically, the second planning unit 15*a* generates the second traveling plan using the recognition result of the vehicle state recognition unit 13 without using the recognition results of the position recognition unit 11 and the environment recognition unit 12. Since the second traveling plan is generated based on a smaller number of recognition results than the first traveling plan, in a case of generating the second traveling plan without using the recognition result with decreased reliability, the second traveling plan is generated without being affected by the decrease in reliability of the recognition result. In a case where the second traveling plan is generated in this way, since the recognition result with decreased reliability is not used, the reliability of the second traveling plan does not decrease with the decrease in reliability of the recognition result. Specifically, even if the recognition result of the position recognition unit 11 and the recognition result of the environment recognition unit 12 decrease in reliability, since the second traveling plan is generated without using these recognition results, the generation of the second traveling plan is not affected by a decrease in reliability.

For this reason, in a case where a situation occurs in which the reliability of the first traveling plan decreases with a decrease in reliability of the recognition result of any one of the position recognition unit 11 and the environment recognition unit 12, the automatic driving control based on the first traveling plan becomes difficult, and the driving operation is taken over to the driver, the second traveling plan is selected by the selection unit 18. In this way, even if a situation occurs in which the automatic driving control based on the first traveling plan becomes difficult and the driving operation is taken over to the driver, while the driver is taking over the driving operation, the automatic driving control of the vehicle M is continued based on the second traveling plan. The second traveling plan is generated for the sake of easily taking over the driving operation to the driver. For this reason, in a state where the vehicle M is subjected to the automatic driving control based on the second traveling plan, it is possible to allow the driver to easily take over the driving operation. As described above, in the automatic driving system 100, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to easily take over the driving operation from a state where the automatic driving control is performed based on the second traveling plan.

The first traveling plan is generated on an assumption that the reliability of the driver state management unit 8*c* is high, that is, the state detection unit 8*a*, the notification unit 8*b*, and the driver state management unit 8*c* are operated normally and the attention of the driver is managed as appropriate. For this reason, in a case where the reliability of the driver state management unit 8*c* decreases, the reliability correction unit 17 corrects the reliability of the first traveling plan to be lowered, whereby the second traveling plan is easily selected by the selection unit 18. In this way, the reliability of the first traveling plan is corrected based on the reliability of the driver state management unit 8*c*, whereby the automatic driving control of the vehicle M is prevented from being performed based on the first traveling plan. Accordingly, even in a case of ending the automatic driving control based on the first traveling plan when the reliability of the driver state management unit 8*c* decreases, the automatic driving control is performed based on the second traveling plan, and thus, it is possible to secure a long time for taking over the driving operation to the driver.

Unlike the first traveling plan, the second traveling plan is generated for the sake of easily taking over the driving operation to the driver. For this reason, it is possible to easily take over the driving operation to the driver from a state where the automatic driving control is performed based on the second traveling plan, and thus, even if the reliability of the driver state management unit 8*c* decreases, the reliability of the second traveling plan may not be corrected.

First Modification Example

Next, as a first modification example, a modification example of the generation method of the second traveling plan in the second calculation unit 15 and a modification example of calculation of the reliability of the second traveling plan in the second reliability calculation unit 15*b* will be described. In the first modification example, the second planning unit 15*a* generates the second traveling plan of the vehicle M based on the position of the vehicle M recognized by the position recognition unit 11, the surrounding environment recognized by the environment recognition unit 12, the state of the vehicle M recognized by the vehicle state recognition unit 13, and the map information of the map database 4 such that the vehicle M travels along the target route set by the navigation system 5. The second planning unit 15a generates the second traveling plan such that at least one of the amount of change in acceleration/deceleration or the amount of change in steering of the vehicle M per unit time is smaller than that in the first traveling plan when generating the second traveling plan. That is, the second traveling plan becomes a traveling plan in which the movement of the vehicle M is not changed significantly compared to the first traveling plan.

The second reliability calculation unit 15b calculates the reliability of the second traveling plan based on at least one of the reliability of the position of the vehicle M recognized by the position recognition unit 11, the reliability of recognition of the surrounding environment of the vehicle M recognized by the environment recognition unit 12, the reliability of recognition of the state of the vehicle M recognized by the vehicle state recognition unit 13, or the second traveling plan generated by the second planning unit 15a. The calculation of the reliability of the second traveling plan in the second reliability calculation unit 15b may be performed in the same manner as in the first reliability calculation unit 14b of the embodiment. In addition, the second reliability calculation unit 15b corrects the calculated reliability of the second traveling plan and sets the corrected reliability of the second traveling plan as the reliability of the second traveling plan. The second reliability calculation unit 15b performs correction such that the reliability of the second traveling plan becomes small when correcting the reliability of the second traveling plan. For example, the second reliability calculation unit 15b may calculate the reliability of the second traveling plan by correcting the calculated reliability of the second traveling plan using a predetermined coefficient.

Even in the case shown in first modification example, the traveling control unit 19 in the automatic driving system 100 performs the automatic driving control of the vehicle M based on the traveling plan having the higher reliability out of the first traveling plan and the second traveling plan. The first planning unit 14a generates the first traveling plan using the recognition results of the position recognition unit 11, the environment recognition unit 12, and the vehicle state recognition unit 13. For example, in a case where the reliability of the recognition result of any one of the position recognition unit 11, the environment recognition unit 12, and the vehicle state recognition unit 13 decreases, the reliability of the first traveling plan decreases with the decrease in reliability of the recognition result. The second planning unit 15a uses the same recognition results as in the first planning unit 14a, but generates the second traveling plan in which at least one of the amount of change in acceleration/deceleration or the amount of change in steering of the vehicle M per unit time is smaller than that in the first traveling plan. That is, the second planning unit 15a generates the second traveling plan for allowing the vehicle M to travel without significantly changing the state of the vehicle M compared to the first traveling plan.

In a case where the state of the vehicle M is not significantly changed, for example, it is possible to generate a traveling plan even if the recognition accuracy of the surrounding environment of the vehicle M is low compared to a case where the state of the vehicle M is significantly changed. For this reason, the second planning unit 15a can generate the second traveling plan even if the reliabilities of the recognition results in the position recognition unit 11, the environment recognition unit 12, and the vehicle state recognition unit 13 are low compared to a case where the first planning unit 14a generates the first traveling plan. Furthermore, since it is possible to generate the second traveling plan even if the reliability of the recognition result is low, the reliability of the second traveling plan is less affected compared to the first traveling plan even if the reliability of the recognition result decreases.

For this reason, even if a situation occurs in which the reliability of the first traveling plan decreases with a decrease in reliability of the recognition result of any one of the position recognition unit 11, the environment recognition unit 12, and the vehicle state recognition unit 13, the automatic driving control based on the first traveling plan becomes difficult, and the driving operation is taken over to the driver, while the driver is taking over the driving operation, the automatic driving control of the vehicle M is continued based on the second traveling plan. In this way, in the automatic driving system 100 of the first modification example, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to easily take over the driving operation from a state where the automatic driving control is performed based on the second traveling plan.

Second Modification Example

Next, as a second modification example, a modification example of the generation method of the second traveling plan in the second calculation unit 15 and a modification example of calculation of the reliability of the second traveling plan in the second reliability calculation unit 15b will be described. In the second modification example, the second planning unit 15a generates the second traveling plan based on the previous first traveling plan generated by the first planning unit 14a.

A first example where the second planning unit 15a generates the second traveling plan based on the previous first traveling plan will be described. The second planning unit 15a acquires the first traveling plan and the reliability of the first traveling plan from the first calculation unit 14 each time the first traveling plan and the reliability of the first traveling plan are generated and calculated. Then, the second planning unit 15a uses, as the second traveling plan, the first traveling plan immediately before the acquired reliability of the first traveling plan becomes equal to or less than a predetermined value. The second reliability calculation unit 15b may correct the reliability of the first traveling plan used as the second traveling plan by the second planning unit 15a, and may set the corrected reliability of the first traveling plan as the reliability of the second traveling plan.

Since the second traveling plan is generated using the first traveling plan previously generated, the reliability of the second traveling plan is lower than the reliability of the first traveling plan used when generating the second traveling plan. For this reason, the second reliability calculation unit 15b corrects the reliability to be lowered by multiplying the reliability of the first traveling plan used to generate the second traveling plan by a predetermined correction coefficient, or the like and sets the corrected reliability of the first traveling plan as the reliability of the second traveling plan. When correcting the reliability of the first traveling plan to be low, when the time elapses from the present (older), the reliability may be corrected to be lowered.

Next, a second example where the second planning unit 15a generates the second traveling plan based on the previous first traveling plan will be described. The second planning unit 15a acquires the first traveling plan and the reliability of the first traveling plan from the first calculation unit 14 each time the first traveling plan and the reliability of the first traveling plan are generated and calculated. The second planning unit 15a uses, as the second traveling plan, the first traveling plan having the highest reliability among the first traveling plan acquired before a predetermined time from the present. The second planning unit 15a may correct the reliability of the first traveling plan such that the value thereof is smaller with the lapse of the time and may use the first traveling plan having the highest reliability after correction as the second traveling plan.

The second reliability calculation unit 15b may correct the reliability of the first traveling plan used as the second traveling plan to be lowered, and may set the corrected reliability of the first traveling plan as the reliability of the second traveling plan. When correcting the reliability of the first traveling plan to be lowered, when the time elapses from the present (older), the reliability may be corrected to be lowered.

Although the first example and the second example have been described as an example where the second traveling plan is generated using the previous first traveling plan, the second traveling plan may be generated by other methods as long as the second traveling plan is based on the previous first traveling plan.

Even in the case shown in the second modification example, the traveling control unit 19 in the automatic driving system 100 performs the automatic driving control of the vehicle M based on a traveling plan having the higher reliability out of the first traveling plan and the second traveling plan. The first planning unit 14a generates the first traveling plan using the recognition results of the position recognition unit 11, the environment recognition unit 12, and the vehicle state recognition unit 13. For example, in a case where the reliability of the recognition result of any one of the position recognition unit 11, the environment recognition unit 12, and the vehicle state recognition unit 13 decreases, the reliability of the first traveling plan decreases immediately with the decrease in reliability of the recognition result. The second planning unit 15a generates the second traveling plan based on the first traveling plan previously generated by the first planning unit 14a. The second reliability calculation unit 15b calculates the reliability of the second traveling plan based on the reliability of the first traveling plan previously generated, and thus, even if the reliability of the recognition result or the like in the position recognition unit 11 decreases, the reliability of the second traveling plan does not decrease immediately. For this reason, in a case where the reliability of the first traveling plan decreases with the decrease in reliability of the recognition result or the like in the position recognition unit 11, the second traveling plan is selected by the selection unit 18.

In this way, even if a situation occurs in which the reliability of the first traveling plan decreases with a decrease in reliability of the recognition result of any one of the position recognition unit 11, the environment recognition unit 12, and the vehicle state recognition unit 13, the automatic driving control based on the first traveling plan becomes difficult, and the driving operation is taken over to the driver, while the driver is taking over the driving operation, the automatic driving control of the vehicle M is continued based on the second traveling plan. Since the second traveling plan is generated based on the first traveling plan previously generated, in general, the reliability of the second traveling plan becomes low. However, the automatic driving control is continued based on the second traveling plan even if reliability is low, instead of stopping the automatic driving control when the automatic driving control based on the first traveling plan becomes difficult, whereby it is possible to secure the time until the driver takes over the driving operation.

In this way, in the automatic driving system, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to easily take over the driving operation from a state where the automatic driving control is performed based on the second traveling plan.

In the second modification example, the second planning unit 15a may correct the first traveling plan such that at least one of the amount of change in acceleration/deceleration or the amount of change in steering of the vehicle M per unit time becomes small, and may set the corrected first traveling plan as the second traveling plan, instead of the previous first traveling plan as the second traveling plan as it is.

Third Modification Example

Next, as a third modification example, a modification example of the generation method of the second traveling plan in the second calculation unit 15 and a modification example of calculation of the reliability of the second traveling plan in the second reliability calculation unit 15b will be described. The third modification example is an example where the second planning unit 15a generates the second traveling plan in a case where the surrounding environment becomes unrecognizable in the environment recognition unit 12. In the third modification example, the second planning unit 15a generates a plan for a route in the second traveling plan of the vehicle M generated to allow the vehicle M to travel along the target route set by the navigation system 5 based on the recognition result of the surrounding environment immediately before the surrounding environment becomes unrecognizable in the environment recognition unit 12, the position of the vehicle M recognized by the position recognition unit 11, the state of the vehicle M recognized by the vehicle state recognition unit 13, and the map information of the map database 4. For example, the recognition result immediately before the surrounding environment becomes unrecognizable in the environment recognition unit 12 may be the recognition result immediately before the reliability of recognition of the surrounding environment of the vehicle M recognized by the environment recognition unit 12 is equal to or less than a predetermined value.

The second planning unit 15a generates the plan for a route such that the amount of change in steering of the vehicle M per unit time is smaller than in the first traveling plan when generating the plan for a route of the second traveling plan. That is, the second traveling plan becomes a traveling plan in which the movement of the vehicle M is not changed significantly compared to the first traveling plan.

The second planning unit 15a generates, as a plan for a speed in the second traveling plan, a plan for a speed in which the vehicle M is reduced in speed, for example, based on the curvature of the generated route, a plan for a speed in which the vehicle M is reduced in speed based on a constant deceleration, or a plan for a speed in which the rate of change in acceleration (jerk) is suppressed in order to prevent a rapid operation. In the plan for a speed, the speed may be adjusted based on the map information (the curvature of a curve, or the like).

The second reliability calculation unit 15b calculates the reliability of the second traveling plan generated by the second planning unit 15a. For example, the second reliability calculation unit 15b calculates the reliability of the second traveling plan based on at least one of the reliability of the position of the vehicle M recognized by the position recognition unit 11, the reliability of recognition of the state of the vehicle M recognized by the vehicle state recognition unit 13, or the second traveling plan generated by the second planning unit 15a.

For example, the second reliability calculation unit 15b may calculate the reliability of the second traveling plan based on the generation period of the second traveling plan in the second planning unit 15a in the same manner as in the first reliability calculation unit 14b described in the embodiment. For example, the second reliability calculation unit 15b may calculate the reliability of the second traveling plan based on the reliability of the position of the vehicle M and the reliability of recognition of the state of the vehicle M calculated by the position recognition unit 11 and the vehicle state recognition unit 13 in the same manner as in the first reliability calculation unit 14b described in the embodiment.

In this way, even if the surrounding environment becomes unrecognizable in the environment recognition unit 12, it is possible to generate the second traveling plan and to calculate the reliability of the second traveling plan in the second calculation unit 15. If the surrounding environment becomes unrecognizable in the environment recognition unit 12, it is not possible to generate the first traveling plan, and a situation occurs in which the automatic driving control based on the first traveling plan becomes difficult and the driving operation is taken over to the driver. In this case, the second traveling plan generated by the second planning unit 15a is selected by the selection unit 18, and the automatic driving control of the vehicle M is executed based on the second traveling plan. In this way, even if a situation occurs in which the automatic driving control based on the first traveling plan becomes difficult and the driving operation is taken over to the driver, while the driver is taking over the driving operation, the automatic driving control of the vehicle M is continued based on the second traveling plan. As described above, in the automatic driving system 100, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to take over the driving operation from a state where the automatic driving control is performed based on the second traveling plan.

Fourth Modification Example

Next, as a fourth modification example, a modification example of the generation method of the second traveling plan in the second calculation unit 15 and a modification example of calculation of the reliability of the second traveling plan in the second reliability calculation unit 15b will be described. The fourth modification example is an example where the second planning unit 15a generates the second traveling plan in a case where the position of the vehicle M becomes unrecognizable in the position recognition unit 11. In the fourth modification example, the second planning unit 15a generates the plan for a route of the second traveling plan based on the first traveling plan generated in the first planning unit 14a immediately before the position of the vehicle M becomes unrecognizable in the position recognition unit 11. The first traveling plan generated immediately before the position of the vehicle M becomes unrecognizable is determined to be correct, and the plan for a route of the first traveling plan is used as the plan for a route of the second traveling plan. The first traveling plan used in the second planning unit 15a is not limited to the first traveling plan immediately before the position of the vehicle M becomes unrecognizable, and the second planning unit 15a may generate the plan for a route of the second traveling plan using the first traveling plan having the highest reliability among the first traveling plans generated before a predetermined time from when the position of the vehicle M becomes unrecognizable in the position recognition unit 11.

The second planning unit 15a may correct the plan for a route of the first traveling plan such that the amount of change in steering of the vehicle M per unit time is smaller than in the first traveling plan when generating the plan for a route of the second traveling plan, and may use the corrected plan for a route as the plan for a route of the second traveling plan.

The second planning unit 15a generates, as the plan for a speed of the second traveling plan, a plan for a speed, for example, based on the inter-vehicle distance, the inter-vehicle time, or the like between a surrounding vehicle recognized by the environment recognition unit 12 and the vehicle M. In this case, the second planning unit 15a generates the plan for a speed such that the inter-vehicle distance, the inter-vehicle time, or the like becomes longer than in the first traveling plan generated in the first planning unit 14a. Furthermore, the second planning unit 15a generates a plan for a speed in which the vehicle M is reduced in speed based on the curvature of the generated route, a plan for a speed in which the vehicle M is reduced in speed based on a constant deceleration, or a plan for a speed in which the rate of change in acceleration (jerk) is suppressed in order to prevent a rapid operation.

The second reliability calculation unit 15b calculates the reliability of the second traveling plan generated by the second planning unit 15a. For example, the second reliability calculation unit 15b calculates the reliability of the second traveling plan based on at least one of the reliability of recognition of the surrounding environment of the vehicle M recognized by the environment recognition unit 12, the reliability of recognition of the state of the vehicle M recognized by the vehicle state recognition unit 13, or the second traveling plan generated by the second planning unit 15a.

For example, the second reliability calculation unit 15b may calculate the reliability of the second traveling plan based on the generation period of the second traveling plan in the second planning unit 15a in the same manner as in the first reliability calculation unit 14b described in the embodiment. For example, the second reliability calculation unit 15b may calculate the reliability of the second traveling plan based on the reliability of recognition of the surrounding environment of the vehicle M and the reliability of recognition of the state of the vehicle M calculated by the environment recognition unit 12 and the vehicle state recognition unit 13 in the same manner as in the first reliability calculation unit 14b described in the embodiment.

Alternatively, the second reliability calculation unit 15b may generate the reliability of the second traveling plan based on the reliability of the first traveling plan. In this case, the second reliability calculation unit 15b may correct the reliability to be lowered by multiplying the reliability of the first traveling plan used to generate the second traveling plan by a predetermined correction coefficient as in the first example in the above-described second modification example, or the like, and may set the corrected reliability of the first traveling plan as the reliability of the second traveling plan.

In this way, even if the position of the vehicle M becomes unrecognizable in the position recognition unit 11, it is possible to generate the second traveling plan and to calculate the reliability of the second traveling plan in the second calculation unit 15. If the position of the vehicle M becomes unrecognizable in the position recognition unit 11, it is not possible to generate the first traveling plan, and a situation occurs in which the automatic driving control based on the first traveling plan becomes difficult and the driving operation is taken over to the driver. In this case, the second traveling plan generated by the second planning unit 15a is selected by the selection unit 18, and the automatic driving control of the vehicle M is executed based on the second traveling plan. In this way, even if a situation occurs in which the automatic driving control based on the first traveling plan becomes difficult and the driving operation is taken over to the driver, while the driver is taking over the driving operation, the automatic driving control of the vehicle M is continued based on the second traveling plan. As described above, in the automatic driving system 100, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to easily take over the driving operation from a state where the automatic driving control is performed based on the second traveling plan.

Fifth Modification Example

Next, as a fifth modification example, a modification example of the generation method of the second traveling plan in the second calculation unit 15 and a modification example of calculation of the reliability of the second traveling plan in the second reliability calculation unit 15b will be described. The fifth modification example is an example where the second planning unit 15a generates the second traveling plan in a case where the position of the vehicle M becomes unrecognizable in the position recognition unit 11 and the surrounding environment becomes unrecognizable in the environment recognition unit 12. In the fifth modification example, the second planning unit 15a generates the plan for a route of the second traveling plan based on the first traveling plan generated by the first planning unit 14a immediately before recognition becomes impossible in the position recognition unit 11 and the environment recognition unit 12.

The first traveling plan generated immediately before recognition becomes impossible in the position recognition unit 11 and the environment recognition unit 12 is determined to be correct, and the plan for a route of the first traveling plan is used as the plan for a route of the second traveling plan. Furthermore, the first traveling plan used in the second planning unit 15a is not limited to the first traveling plan immediately before recognition becomes impossible in the position recognition unit 11 and the environment recognition unit 12, and the second planning unit 15a may generate the plan for a route of the second traveling plan using the first traveling plan having the highest reliability among the first traveling plans generated before a predetermined time from when recognition becomes impossible in the position recognition unit 11 and the environment recognition unit 12.

The second planning unit 15a may correct the plan for a route of the first traveling plan such that the amount of change in steering of the vehicle M per unit time becomes smaller than in the first traveling plan when generating the plan for a route of the second traveling plan, and may use the corrected plan for a route as the plan for a route of the second traveling plan.

The second planning unit 15a generates a plan for a speed in which the vehicle M is reduced in speed based on the curvature of the generated route, a plan for a speed in which the vehicle M is reduced in speed based on constant deceleration, or a plan for a speed in which the rate of change in acceleration (jerk) is suppressed in order to prevent a rapid operation.

The second reliability calculation unit 15b calculates the reliability of the second traveling plan generated by the second planning unit 15a. For example, the second reliability calculation unit 15b calculates the reliability of the second traveling plan based on at least one of the reliability of recognition of the state of the vehicle M recognized by the vehicle state recognition unit 13 or the second traveling plan generated by the second planning unit 15a.

For example, the second reliability calculation unit 15b may calculate the reliability of the second traveling plan based on the generation period of the second traveling plan in the second planning unit 15a in the same manner as in the first reliability calculation unit 14b described in the embodiment. For example, second reliability calculation unit 15b may calculate the reliability of the second traveling plan based on the reliability of recognition of the state of the vehicle M calculated by the vehicle state recognition unit 13 in the same manner as in the first reliability calculation unit 14b described in the embodiment.

Alternatively, the second reliability calculation unit 15b may generate the reliability of the second traveling plan based on the reliability of the first traveling plan. In this case, the second reliability calculation unit 15b may correct the reliability to be lowered by multiplying the reliability of the first traveling plan used to generate the second traveling plan by a predetermined correction coefficient as in the first example in the above-described second modification example, or the like, and may set the corrected reliability of the first traveling plan as the reliability of the second traveling plan.

In this way, even if recognition becomes impossible in the position recognition unit 11 and the environment recognition unit 12, it is possible to generate the second traveling plan and to calculate the reliability of the second traveling plan in the second calculation unit 15. If recognition becomes impossible in the position recognition unit 11 and the environment recognition unit 12, it is not possible to generate the first traveling plan, and a situation occurs in which the automatic driving control based on the first traveling plan becomes difficult and the driving operation is taken over to the driver. In this case, the second traveling plan generated by the second planning unit 15a is selected by the selection unit 18, and the automatic driving control of the vehicle M is executed based on the second traveling plan. In this way, even if a situation occurs in which the automatic driving control based on the first traveling plan becomes difficult and the driving operation is taken over to the driver, while the driver is taking over the driving operation, the automatic driving control of the vehicle M is continued based on the second traveling plan. As described above, in the automatic driving system 100, even in a case where the automatic driving control based on the first traveling plan becomes difficult and the driving operation is taken over to the driver, the automatic driving control is continued based on the second traveling plan, and thus, it is possible to secure a long time for taking over the driving operation to the driver. Then, it is possible to allow the driver to easily take over the driving operation from a state where the automatic driving control is performed based on the second traveling plan.

Although the embodiment of the present disclosure and various modification examples have been described above, the present disclosure is not limited to the foregoing embodiment and various modification examples. For example, although the automatic driving system 100 selects the traveling plan having high reliability out of the two traveling plans (first traveling plan and second traveling plan) and executes the automatic driving control, a traveling plan having the highest reliability may be selected from among three traveling plans and the automatic driving control may be executed. For example, like an automatic driving system 100A shown in FIG. 3, an ECU 6A may include a first calculation unit 14, a second calculation unit 15, and a third calculation unit 20. The third calculation unit 20 generates a third traveling plan and calculates the reliability of the third traveling plan in the same manner as in the second calculation unit 15. The third calculation unit 20 includes a third planning unit 20a and a third reliability calculation unit 20b. The third planning unit 20a generates, as the third traveling plan, a traveling plan in the same manner as in the second planning unit 15a for the sake of easily taking over the driving operation to the driver from a state where the automatic driving control is performed based on the third traveling plan. The third reliability calculation unit 20b calculates the reliability of the third traveling plan in the same manner as in the second reliability calculation unit 15b.

The second calculation unit 15 and the third calculation unit 20 respectively generate and calculate the second traveling plan and the reliability of the second traveling plan, and the third traveling plan and the reliability of the third traveling plan using any method among various generation methods of the second traveling plan and various calculation methods of the reliability of the second traveling plan described in the foregoing embodiment and the first to fifth modification examples. The selection unit 18 selects the traveling plan having the highest reliability among the first traveling plan generated by the first planning unit 14a, the second traveling plan generated by the second planning unit 15a, and the third traveling plan generated by the third planning unit 20a. Even in this case, even if a situation occurs in which the automatic driving control based on the first traveling plan becomes difficult and the driving operation is taken over to the driver, while the driver is taking over the driving operation, it is possible to continue the automatic driving control of the vehicle M based on the second traveling plan or the third traveling plan. Then, it is possible to allow the driver to easily take over the driving operation from a state where the automatic driving control is performed based on the second traveling plan or the third traveling plan.

Figure 3:
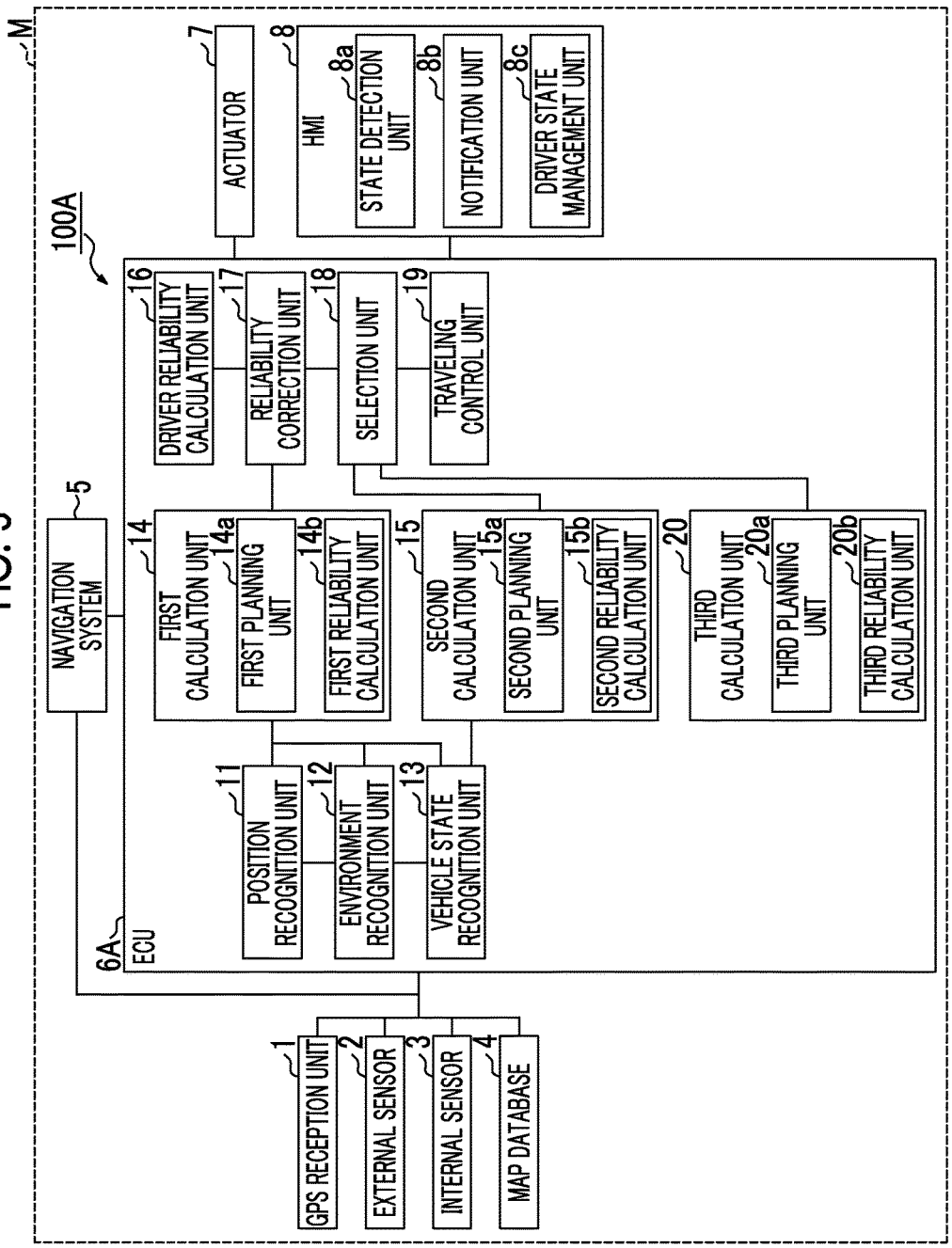
FIG. 3 is a diagram showing the schematic configuration of an automatic driving system according to a modification example.

In the automatic driving systems 100, 100A shown in FIGS. 1 and 3, although the traveling plan having the highest reliability is selected out of the two or three traveling plans and the automatic driving control is performed, a traveling plan having the highest reliability may be selected from among four or more traveling plans and the automatic driving control may be performed.

In the automatic driving systems 100, 100A, the reliability of the first traveling plan is not necessarily corrected based on the reliability of the driver state management unit 8c, and the driver reliability calculation unit 16 and the reliability correction unit 17 may not be provided. In this case, the selection unit 18 selects a traveling plan using the reliability of the first traveling plan being not corrected.

In the embodiment and various modification examples, the first planning unit 14a may generate the first traveling plan based on the recognition results other than the position of the vehicle M without using the recognized position of the vehicle M in the position recognition unit 11.

In the embodiment, although the second planning unit 15a generates the second traveling plan of the vehicle M based on the state of the vehicle M recognized by the vehicle state recognition unit 13, the present disclosure is not limited to a case where the second traveling plan is generated only using the recognition result of the vehicle state recognition unit 13. For example, the second planning unit 15a may generate the second traveling plan based on one or two of the position of the vehicle M recognized by the position recognition unit 11, the surrounding environment of the vehicle M recognized by the environment recognition unit 12, and the state of the vehicle M recognized by the vehicle state recognition unit 13. Then, the second reliability calculation unit 15b may calculate the reliability of the second traveling plan based on at least one of the reliability of the recognition result used when the second planning unit 15a generates the second traveling plan among the position of the vehicle M recognized by the position recognition unit 11, the surrounding environment of the vehicle M recognized by the environment recognition unit 12, and the state of the vehicle M recognized by the vehicle state recognition unit 13, or the second traveling plan.

What is claimed is:
1. An automatic driving system of a vehicle comprising:
an actuator configured to control traveling of the vehicle; and
an electronic control unit configured to
recognize a position of the vehicle based on a detection result of an external sensor or reception information of a receiver, the external sensor being mounted in the vehicle, and the external sensor being configured to detect external circumstances of the vehicle,
recognize a surrounding environment of the vehicle based on the detection result of the external sensor,
recognize a state of the vehicle based on a detection result of an internal sensor configured to detect the state of the vehicle,
generate a first traveling plan of the vehicle based on the recognized position of the vehicle, the recognized surrounding environment of the vehicle, and the recognized state of the vehicle,
calculate reliability of the first traveling plan based on at least one of reliability of the recognized position of the vehicle, reliability of recognition of the rec- ognized surrounding environment of the vehicle, reliability of recognition of the recognized state of the vehicle, or the generated first traveling plan, generate a second traveling plan of the vehicle based on one or two of the recognized position of the vehicle, the recognized surrounding environment of the vehicle, and the recognized state of the vehicle, calculate reliability of the second traveling plan based on at least one of the generated second traveling plan or reliability of a recognition result used when the second traveling plan is generated among the recognized position of the vehicle, the recognized surrounding environment of the vehicle, and the recognized state of the vehicle, select a traveling plan having the higher reliability out of the first traveling plan and the second traveling plan, and control the traveling of the vehicle by the actuator based on the selected traveling plan.

2. The automatic driving system according to claim 1, wherein the electronic control unit is configured to generate the second traveling plan based on the state of the vehicle among the recognized position of the vehicle, the recognized surrounding environment of the vehicle, and the recognized state of the vehicle.

3. The automatic driving system according to claim 1, wherein the electronic control unit is configured to generate the second traveling plan such that at least one of an amount of change in acceleration or deceleration of the vehicle per unit time, or an amount of change in steering of the vehicle per unit time is smaller in the second traveling plan than in the first traveling plan.

4. The automatic driving system according to claim 1, further comprising:

a notification unit configured to give notification to a driver such that the driver takes over a driving operation when the second traveling plan is selected by the electronic control unit.

5. The automatic driving system according to claim 1, further comprising:

a human machine interface that includes a notification unit, the human machine interface configured to manage attention of a driver to the traveling of the vehicle by giving notification to the driver through the notification unit based on a detection result of a detector configured to detect a state of the driver of the vehicle, wherein the electronic control unit is configured to calculate reliability of the human machine interface based on at least one of reliability of the detection result of the detector, a state of the detector, a state of the notification unit, a state of the human machine interface, or management circumstances of the attention of the driver, and correct the reliability of the first traveling plan based on the reliability of the human machine interface.

6. An automatic driving system of a vehicle comprising:

an actuator configured to control traveling of the vehicle; and an electronic control unit configured to recognize a position of the vehicle based on a detection result of an external sensor or reception information of a receiver, the external sensor being mounted in the vehicle, and the external sensor being configured to detect external circumstances of the vehicle, recognize a surrounding environment of the vehicle based on the detection result of the external sensor, recognize a state of the vehicle based on a detection result of an internal sensor configured to detect the state of the vehicle, generate a first traveling plan of the vehicle based on the recognized position of the vehicle, the recognized surrounding environment of the vehicle, and the recognized state of the vehicle, calculate reliability of the first traveling plan based on at least one of reliability of the recognized position of the vehicle, reliability of recognition of the recognized surrounding environment of the vehicle, reliability of recognition of the recognized state of the vehicle, or the generated first traveling plan, generate a second traveling plan based on the recognized position of the vehicle, the recognized surrounding environment of the vehicle, and the recognized state of the vehicle such that an amount of change in acceleration or deceleration of the vehicle per unit time, or an amount of change in steering of the vehicle per unit time is smaller in the second traveling plan than in the first traveling plan, calculate reliability of the second traveling plan based on at least one of the reliability of the recognized position of the vehicle, the reliability of recognition of the recognized surrounding environment of the vehicle, the reliability of recognition of the recognized state of the vehicle, or the generated second traveling plan and perform correction to lower the calculated reliability of the second traveling plan, select a traveling plan having the higher reliability out of the first traveling plan and the second traveling plan, and control the traveling of the vehicle by the actuator based on the selected traveling plan.

7. The automatic driving system according to claim 6, further comprising:

a notification unit configured to give notification to a driver such that the driver takes over a driving operation when the second traveling plan is selected by the electronic control unit.

8. The automatic driving system according to claim 6, further comprising:

a human machine interface that includes a notification unit, the human machine interface configured to manage attention of a driver to the traveling of the vehicle by giving notification to the driver through the notification unit based on a detection result of a detector configured to detect a state of the driver of the vehicle, wherein the electronic control unit is configured to calculate reliability of the human machine interface based on at least one of reliability of the detection result of the detector, a state of the detector, a state of the notification unit, a state of the human machine interface, or management circumstances of the attention of the driver, and correct the reliability of the first traveling plan based on the reliability of the human machine interface.

9. An automatic driving system of a vehicle comprising:

an actuator configured to control traveling of the vehicle; and an electronic control unit configured to recognize a position of the vehicle based on a detection result of an external sensor or reception information of a receiver, the external sensor being mounted in the vehicle, and the external sensor being configured to detect external circumstances of the vehicle, recognize a surrounding environment of the vehicle based on the detection result of the external sensor, recognize a state of the vehicle based on a detection result of an internal sensor configured to detect the state of the vehicle, generate a first traveling plan of the vehicle based on the recognized position of the vehicle, the recognized surrounding environment of the vehicle, and the recognized state of the vehicle, calculate reliability of the first traveling plan based on at least one of reliability of the recognized position of the vehicle, reliability of recognition of the recognized surrounding environment of the vehicle, reliability of recognition of the recognized state of the vehicle, or the generated first traveling plan, generate a second traveling plan based on a previous first traveling plan, calculate reliability of the second traveling plan based on reliability of the previous first traveling plan used when generating the second traveling plan, select a traveling plan having the higher reliability out of the first traveling plan and the second traveling plan, and control the traveling of the vehicle by the actuator based on the selected traveling plan.

10. The automatic driving system according to claim 9, wherein the electronic control unit is configured to calculate the reliability of the first traveling plan each time when the first traveling plan is generated, acquire the reliability of the first traveling plan each time when the reliability of the first traveling plan is calculated, and when the acquired reliability of the first traveling plan is equal to or less than a predetermined value, use the last first traveling plan acquired before the first traveling plan having the reliability equal to or less than the predetermined value, as the second traveling plan.

11. The automatic driving system according to claim 9, wherein the electronic control unit is configured to calculate the reliability of the first traveling plan each time when the first traveling plan is generated, acquire the reliability of the first traveling plan each time when the reliability of the first traveling plan is calculated, and use first traveling plan having the highest reliability among first traveling plans acquired from a predetermined time before present to the present, as the second traveling plan.

12. The automatic driving system according to claim 9, wherein the electronic control unit is configured to generate the second traveling plan such that at least one of an amount of change in acceleration or deceleration of the vehicle per unit time, or an amount of change in steering of the vehicle per unit time is smaller in the second traveling plan than in the first traveling plan.

13. The automatic driving system according to claim 9, further comprising:

a notification unit configured to give notification to a driver such that the driver takes over a driving operation when the second traveling plan is selected by the electronic control unit.

14. The automatic driving system according to claim 9, further comprising:

a human machine interface that includes a notification unit, the human machine interface configured to manage attention of a driver to the traveling of the vehicle by giving notification to the driver through the notification unit based on a detection result of a detector configured to detect a state of the driver of the vehicle, wherein the electronic control unit is configured to calculate reliability of the human machine interface based on at least one of reliability of the detection result of the detector, a state of the detector, a state of the notification unit, a state of the human machine interface, or management circumstances of the attention of the driver, and correct the reliability of the first traveling plan based on the reliability of the human machine interface.

* * * * *